(12) United States Patent
Yoshitomi

(10) Patent No.: US 9,570,725 B2
(45) Date of Patent: Feb. 14, 2017

(54) SEPARATOR FOR NONAQUEOUS ELECTROLYTE BATTERY, AND NON-AQUEOUS ELECTROLYTE SECONDARY BATTERY

(75) Inventor: Takashi Yoshitomi, Iwakuni (JP)

(73) Assignee: TEIJIN LIMITED, Osaka (JP)

( * ) Notice: Subject to any disclaimer, the term of this patent is extended or adjusted under 35 U.S.C. 154(b) by 355 days.

(21) Appl. No.: 13/881,314

(22) PCT Filed: Oct. 21, 2011

(86) PCT No.: PCT/JP2011/074337
§ 371 (c)(1),
(2), (4) Date: Apr. 24, 2013

(87) PCT Pub. No.: WO2012/057037
PCT Pub. Date: May 3, 2012

(65) Prior Publication Data
US 2013/0224560 A1 Aug. 29, 2013

(30) Foreign Application Priority Data
Oct. 29, 2010 (JP) ................................. 2010-243898

(51) Int. Cl.
*H01M 2/16* (2006.01)
*H01M 10/0525* (2010.01)
*H01M 2/34* (2006.01)

(52) U.S. Cl.
CPC ........... *H01M 2/162* (2013.01); *H01M 2/1653* (2013.01); *H01M 2/1686* (2013.01);
(Continued)

(58) Field of Classification Search
None
See application file for complete search history.

(56) References Cited

U.S. PATENT DOCUMENTS 5,641,565 A * 6/1997 Sogo .......................... 428/315.7
2006/0123635 A1 6/2006 Hurley et al.
(Continued)

FOREIGN PATENT DOCUMENTS

CN 1057873 C 10/2000
CN 1846840 A 10/2006
(Continued)

OTHER PUBLICATIONS

Communication dated Feb. 16, 2015, issued by the Taiwanese Patent Office in counterpart Application No. 10420204690.
(Continued)

*Primary Examiner* — Carlos Barcena
*Assistant Examiner* — Wojciech Haske
(74) *Attorney, Agent, or Firm* — Sughrue Mion, PLLC

(57) ABSTRACT

Disclosed is a separator for a non-aqueous electrolyte battery, the separator including a polyolefin microporous substrate in which a content of polyolefin having a molecular weight of 100,000 or less is from 10% by mass to 25% by mass relative to a total amount of polyolefin, and a heat resistant porous layer that is formed on one or both sides of the polyolefin microporous substrate and that includes a heat resistant polymer, wherein a maximum value of S, which is represented by the following formula (1), is 0.8 or more, and a temperature exhibiting the maximum value of S is from 130° C. to 155° C.:

$S = d(\log R)/dT$   Formula (1):

wherein R represents a resistance (ohm·cm$^2$) of a cell, and T represents a temperature (° C.), in a measurement using a battery that includes the cell that is provided with a separator for a non-aqueous electrolyte battery, at a temperature rising rate of 1.6° C./min.

6 Claims, 1 Drawing Sheet

(52) U.S. Cl.
CPC ........ *H01M 2/1613* (2013.01); *H01M 2/1646* (2013.01); *H01M 2/1666* (2013.01); *H01M 2/348* (2013.01); *H01M 10/0525* (2013.01)

(56) References Cited

U.S. PATENT DOCUMENTS

| | | |
|---|---|---|
| 2006/0234031 A1 | 10/2006 | Takata et al. |
| 2008/0134522 A1 | 6/2008 | Hurley |
| 2008/0141541 A1 | 6/2008 | Hurley |
| 2008/0172844 A1 | 7/2008 | Hurley |
| 2008/0189958 A1 | 8/2008 | Hurley |
| 2008/0271325 A1 | 11/2008 | Hurley |
| 2010/0099022 A1* | 4/2010 | Nishida et al. ............... 429/144 |
| 2010/0143783 A1* | 6/2010 | Nishikawa et al. .......... 429/145 |
| 2010/0173187 A1 | 7/2010 | Nishikawa et al. |

FOREIGN PATENT DOCUMENTS

| | | |
|---|---|---|
| CN | 101558513 A | 10/2009 |
| CN | 101689624 A | 3/2010 |
| JP | 2000-030686 A | 1/2000 |
| JP | 2002-355938 A | 12/2002 |
| JP | 2005-209570 A | 8/2005 |
| JP | 2005-285385 A | 10/2005 |
| JP | 2006-307163 A | 11/2006 |
| JP | 2006-307193 A | 11/2006 |
| JP | 2008-080536 A | 4/2008 |
| JP | 2009-143060 A | 7/2009 |
| JP | 2009-205959 A | 9/2009 |
| WO | 2007-013179 A1 | 2/2007 |
| WO | 2008/062727 A1 | 5/2008 |
| WO | WO 2008105555 A1 * | 9/2008 |
| WO | 2008-149895 A1 | 12/2008 |
| WO | 2008-156033 A1 | 12/2008 |
| WO | 2010-021248 A1 | 2/2010 |

OTHER PUBLICATIONS

Communication dated Aug. 20, 2015, issued by the State Intellectual Property Office of the P.R.C. in corresponding Chinese Application No. 201180051722.4.

* cited by examiner

SEPARATOR FOR NONAQUEOUS ELECTROLYTE BATTERY, AND NON-AQUEOUS ELECTROLYTE SECONDARY BATTERY

CROSS REFERENCE TO RELATED APPLICATIONS

This application is a National Stage of International Application No. PCT/JP2011/074337 filed Oct. 21, 2011 (claiming priority based on Japanese Patent Application No. 2010-243898, filed Oct. 29, 2010), the contents of which are incorporated herein by reference in their entirety.

TECHNICAL FIELD

The present invention relates to a separator for a non-aqueous electrolyte battery and a non-aqueous electrolyte secondary battery.

BACKGROUND ART

A non-aqueous electrolyte secondary battery, which is typified by a lithium ion secondary battery, is widely used as a main electric power source of portable electronic equipment such as cellular phones and a notebook computers. Further, a non-aqueous electrolyte secondary battery is broadly used as a main electric power source of electric cars or hybrid cars, power storage systems for night time electricity, or the like. As a result of the wide spread use of non-aqueous electrolyte secondary batteries, ensuring stable battery characteristics and safety are important issues.

A separator plays an important role in ensuring the safety of a nonaqueous electrolyte secondary battery. As it now stands, a porous film containing polyolefin as a main component is used from the viewpoint of, in particular, a shutdown function. In the field of non-aqueous electrolyte secondary batteries, a shutdown function means the function of blocking an ion flow by closing the pores of the porous film as a result of melting polyolefin when abnormal heat generation occurs in the battery, thereby preventing the battery from suffering thermal runaway.

However, when the battery temperature further increases even after the shutdown function starts, the entire polyolefin porous film melts (a so-called "melt-down"). As a result, a short circuit occurs inside the battery and, as a large amount of heat is generated in conjunction with the short circuit, and there is a risk of smoke generation, ignition or an explosion occurring in the battery. For such reasons, a separator is required to have not only a shutdown function, but also heat resistance that does not allow a melt-down even at a temperature higher than the temperature at which the shutdown function commences.

In order to prevent a melt-down of a separator, it has been proposed to form a heat resistant layer containing a heat resistant resin, such as polyamide, on one or both surfaces of a polyolefin porous film (e.g., see Patent Documents 1 to 12). According to these proposals, the ensuring of safety of a battery at high temperature can be expected since both the shutdown function and the inhibition of a melt-down are achieved.

Patent Document 1: Japanese Patent Application Laid-Open (JP-A) No. 2002-355938
Patent Document 2: JP-A No. 2005-209570
Patent Document 3: JP-A No. 2005-285385
Patent Document 4: JP-A No. 2000-030686
Patent Document 5: JP-A No. 2009-205959
Patent Document 6: JP-A No. 2009-143060
Patent Document 7: JP-A No. 2008-080536
Patent Document 8: WO 2007/013179 A
Patent Document 9: WO 2008/156033 A
Patent Document 10: WO 2008/062727 A
Patent Document 11: WO 2008/149895 A
Patent Document 12: WO 2010/021248 A

SUMMARY OF INVENTION

Technical Problem

However, when a heat resistant layer is formed on one or both surfaces of a polyolefin porous film, generally, the responsiveness of the shutdown function tends to decrease. In the marketplace, a separator which satisfies (1) shutdown promptly starting in accordance with a rise in internal temperature of a battery, (2) a temperature width from the start of shutdown to the closing of pores of a separator being narrow, and (3) a melt-down being inhibited with high certainty, is in demand. Conventionally, regarding a separator having a heat resistant layer formed on one or both surfaces of a polyolefin porous film, there are no separator focused on items (1) to (3) described above.

The present invention has been made in view of the above circumstances. Under these circumstances, a separator for a non-aqueous electrolyte battery having excellent shutdown responsiveness and excellent short circuit resistance is needed. Further, a non-aqueous electrolyte secondary battery provided with a separator for a non-aqueous electrolyte battery, which is highly safe at the time of use, is needed.

Solution to Problem

Specific means for solving the problems described above are as follows.

<1> A separator for a non-aqueous electrolyte battery, the separator including: a polyolefin microporous substrate in which a content of polyolefin having a molecular weight of 100,000 or less is from 10% by mass to 25% by mass relative to a total amount of polyolefin, and a heat resistant porous layer that is formed on one or both sides of the polyolefin microporous substrate and that includes a heat resistant polymer, wherein a maximum value of S, which is represented by the following formula (1), is 0.8 or more, and a temperature exhibiting the maximum value of S is from 130° C. to 155° C.

$$S = d(\log R)/dT \quad \text{Formula (1):}$$

In formula (1), R represents a resistance (ohm·cm$^2$) of a cell, and T represents a temperature (° C.), in a measurement using a battery that includes the cell that is provided with a separator for a non-aqueous electrolyte battery, at a temperature rising rate of 1.6° C./min.

<2> The separator for a non-aqueous electrolyte battery described in <1>, wherein in the polyolefine microporous substrate, a polyethylene content relative to a total amount of polyolefin is 90% by mass or more.

<3> The separator for a non-aqueous electrolyte battery described in <1> or <2>, wherein a difference between the temperature exhibiting the maximum value of S and a lowest temperature among temperatures exhibiting a value of S of 0.8 is 5° C. or less.

<4> The separator for a non-aqueous electrolyte battery described in any one of <1> to <3>, wherein the heat resistant porous layer has a porosity of from 30% to 90%, and a pore diameter as measured by a specific surface area method of from 50 nm to 250 nm.

<5> The separator for a non-aqueous electrolyte battery described in any one of <1> to <4>, wherein the polyolefin microporous substrate has a porosity of from 20% to 60%, and a pore diameter as measured by a specific surface area method of from 10 nm to 150 nm.

<6> A non-aqueous electrolyte secondary battery comprising a positive electrode, a negative electrode, and a separator for a non-aqueous electrolyte battery described in any one of <1> to <5> that is disposed between the positive electrode and negative electrode, the battery obtaining an electromotive force through doping and dedoping of lithium.

Advantageous Effects of Invention

According to the present invention, a separator for a non-aqueous electrolyte battery having excellent shut down responsiveness and excellent short circuit resistance is provided. Further, according to the invention, a non-aqueous electrolyte secondary battery provided with a separator for a non-aqueous electrolyte battery, which is highly safe at the time of use, is provided.

DESCRIPTION OF EMBODIMENTS

Figure 1:
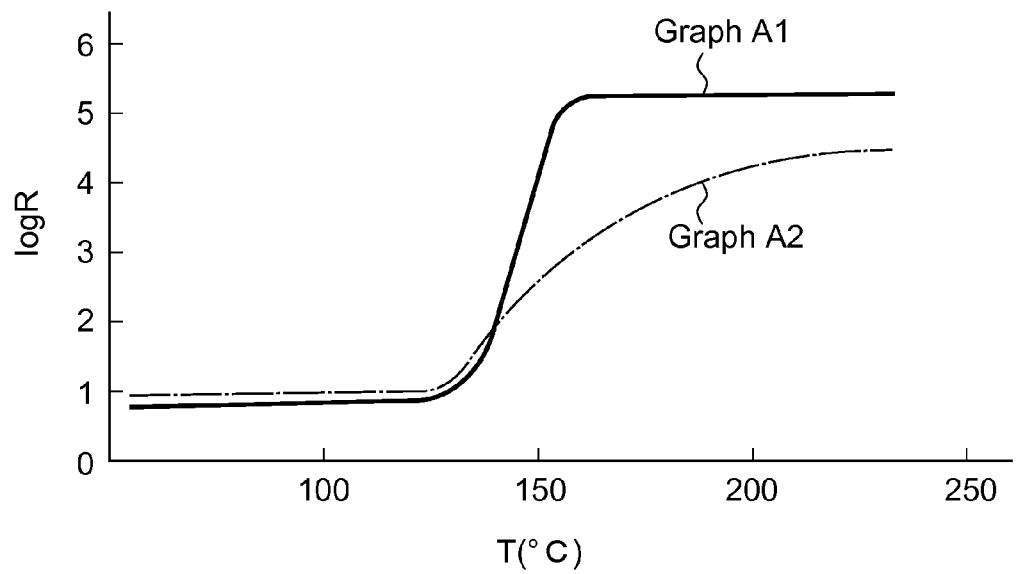
FIG. 1 is a conceptual diagram illustrating the change in resistance R of a cell in accordance with temperature rise.

Herein below, modes for carrying out the invention are explained in greater detail. However, the invention is not limited to them and various modifications can be made within the scope of the gist of the invention.

Further, the numerical range described with "to" in the specification means a range which includes the numbers described before and after "to" as a lower limit and an upper limit, respectively.

<Separator for Non-aqueous Electrolyte Battery>

The separator for a non-aqueous electrolyte battery according to the invention includes a polyolefin microporous substrate (herein below, referred to as a "microporous substrate" or a "substrate") and a heat resistant porous layer that is formed on one or both sides of the polyolefin microporous substrate and that includes a heat resistant polymer. According to the constitution, the separator for a non-aqueous electrolyte battery has a shutdown function and heat resistance.

Further, in the separator for a non-aqueous electrolyte battery according to the invention, the content of polyolefin having a molecular weight of 100,000 or less is from 10% by mass to 25% by mass relative to the total amount of polyolefin as a component of the polyolefin microporous substrate, the maximum value of S, which is represented by formula (1), is 0.8 or more, and the temperature exhibiting the maximum value of S is from 130° C. to 155° C. According to the constitution, the separator for a non-aqueous electrolyte battery has excellent shut down responsiveness and excellent short circuit resistance.

$$S = d(\log R)/dT \quad \text{Formula (1):}$$

In formula (1), R represents the resistance (ohm·cm$^2$) of a cell, and T represents a temperature (° C.), in a measurement using a battery that includes the cell that is provided with a separator for a non-aqueous electrolyte battery, at a temperature rising rate of 1.6° C./min.

S represented by formula (1) is a value obtained by differentiation of common logarithmic value of R (that is, log R) with T.

Specifically, the cell resistance (ohm·cm$^2$) represented as R in formula (1) is measured according to the following method.

The separator for a non-aqueous electrolyte battery is punched to a circle with a diameter of 19 mm, and immersed in a methanol solution having 3% by mass of a nonionic surfactant dissolved therein, followed by air drying. The separator for a non-aqueous electrolyte battery is inserted between two stainless steel plate electrodes each having thickness of 0.4 mm and diameter of 15.5 mm such that center of the separator for a non-aqueous electrolyte battery is overlapped with centers of two stainless plates. Then, the separator for a non-aqueous electrolyte battery sandwiched between the electrodes is impregnated with a 1 M solution of LiBF$_4$/[propylene carbonate/ethylene carbonate (mass ratio 1/1)] as an electrolytic solution and the resulting product is encapsulated in a cell (2032 type coin cell: diameter of 20 mm, thickness of 3.2 mm, material: stainless steel) to give a cointype battery. To measure the temperature (T) of a separator, lead wires are connected to the inside of the battery, which is attached with a thermocouple. The battery is then placed in an oven. The temperature is raised at a temperature rising rate of 1.6° C./min to raise the temperature (T) inside the battery and the temperature of the separator. At that time, a voltage is applied between electrodes according to alternating current impedance method at an amplitude of 10 mV and a frequency of 100 kHz, thereby measuring the resistance (R) (ohm·cm$^2$) of the cell included in the battery.

Herein, the cell resistance measured by the method described above corresponds to electric resistance measured in such a manner that, as components of the battery, members other than the separator are included. The rate of change in electric resistance, in which the change occurs in accordance with the temperature rise, is hardly affected by the members other than the separator such as an electrode, and depends on characteristics of a separator. Thus, S obtained from R according to formula (1) is regarded as a characteristic of a separator.

Figure 2:
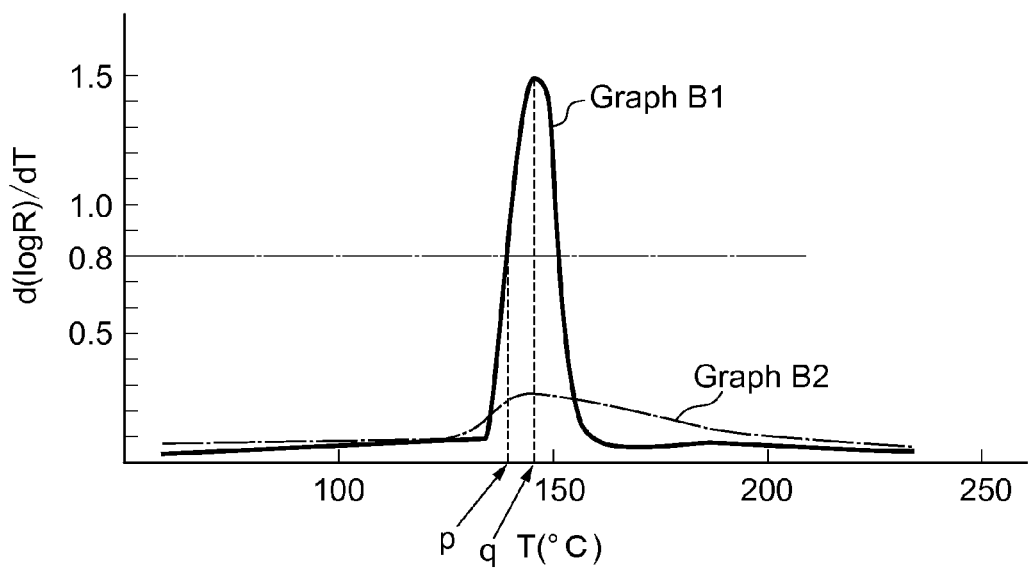
FIG. 2 is a conceptual diagram illustrating the rate of change in resistance R of a cell.

FIGS. 1 and 2 are a conceptual diagram illustrating the resistance R (ohm·cm$^2$) of a cell that is measured by the method described above. Specifically, FIG. 1 shows a change in the resistance R of a cell in accordance with temperature rise, and FIG. 2 shows the rate of change in resistance R of a cell.

When the separator for a non-aqueous electrolyte battery according to the invention is used, as illustrated in graph A1 of FIG. 1, for example, log R starts to increase at near 130° C., and log R is saturated at near 155° C. This indicates that the polyolefin as a component of the polyolefin microporous substrate starts to melt at near 130° C., whereby starting to close the pores of the microporous substrate, and at near 155° C., the closing of the pores of the microporous substrate is completed, resulting in blocking an ion flow.

At that time, as illustrated in graph B1 of FIG. 2, [d(log R)/dT] exhibits the maximum value (peak) in the temperature range of from 130° C. to 155° C. The temperature at which [d(log R)/dT] exhibits the maximum value (peak) is a temperature at which the rate of closing the microporous substrate is the highest. When the separator for a non-aqueous electrolyte battery according to the invention is used, the maximum value is 0.8 or more.

As described above, in the temperature range of from 130° C. to 155° C., the separator for a non-aqueous electrolyte battery according to the invention exhibits rapid increase in log R, that is, the separator exhibits the maximum value of [d(log R)/dT] of 0.8 or more. Thus, the separator for a non-aqueous electrolyte battery according to the invention quickly expresses the shutdown function, and therefore has excellent shut down responsiveness.

Meanwhile, FIGS. 1 and 2 are conceptual diagrams, and the invention is not limited to them.

Graph A2 of FIG. 1 and graph B2 of FIG. 2 are conceptual diagrams for a case in which a separator which is not a separator for a non-aqueous electrolyte battery according to the invention is used. As illustrated by graph A2 of FIG. 1, log R is gradually increased in a range of from about 130° C. to high temperature region. Meanwhile, graph B2 of FIG. 2 does not show any sharp peak, and the maximum value of [d(log R)/dT] is less than 0.8.

This indicates that closing of the pores of the microporous substrate is slowly progressed in a broad range of temperature. Accordingly, the shutdown function is not quickly exhibited and, therefore, short circuit of a battery may be caused.

The separator for a non-aqueous electrolyte battery according to the invention has the maximum value of S=d(log R)/dT of 0.8 or more. When the maximum value of S is 0.8 or more, closing of the pores of the microporous substrate quickly progresses, and excellent shut down responsiveness is exhibited. When maximum value of S is less than 0.8, shut down responsiveness may be insufficient, and thus short circuit of a battery may be caused. S is preferably 1.0 or more, more preferably 1.2 or more, still more preferably 1.3 or more, and particularly preferably 1.5 or more.

The separator for a non-aqueous electrolyte battery according to the invention exhibits the maximum value of S in the temperature range of from 130° C. to 155° C. When the temperature exhibiting the maximum value of S is lower than 130° C., melting of the polyolefin microporous substrate may occur at low temperature, which may be undesirable in terms of safety of batteries. On the other hand, when the temperature exhibiting the maximum value of S is higher than 155° C., various materials used in constituting the batteries are exposed to high temperature, which may be undesirable in some cases as sufficient safety cannot be expected. The temperature exhibiting the maximum value of S is preferably from 135° C. to 150° C., and more preferably from 135° C. to 148° C.

Regarding the separator for a non-aqueous electrolyte battery according to the invention, the difference between the temperature exhibiting the maximum value of S and the lowest temperature among the temperatures exhibiting the value of S of 0.8 is preferably 5° C. or less (herein below, it is also referred to as "$\Delta T$").

When explanations are made in view of graph B1 of FIG. 2, the temperature exhibiting the maximum value of S is q° C., the lowest temperature among the temperatures exhibiting the value of S of 0.8 is p° C., and $\Delta T$ is represented by (q−p)° C.

It is believed that, in the separator for a non-aqueous electrolyte battery according to the invention, closing of pores of microporous substrate is sufficiently progressed (that is, shutdown function is expressed) to the extent that short circuit of a battery can be inhibited, during a period starting from the melting of polyolefin as a component of the polyolefin microporous substrate to the point at which S exhibits the maximum value. In this regard, it can be said that smaller $\Delta T$ value indicates shorter time between the start of melting of polyolefin and the shutdown. Thus, heat generation from batteries can be suppressed more as $\Delta T$ has a smaller value, and thus short circuit caused by melt down of a separator can be suppressed. From the viewpoint of balance between short circuit resistance and industrial cost required for manufacturing a separator, $\Delta T$ is preferably from 0.1° C. to 5° C., and more preferably from 0.1° C. to 3° C.

The separator for a non-aqueous electrolyte battery according to the invention preferably has, in a range of from 135° C. to 150° C., $\Delta T$ of from 0.1° C. to 5° C., and more preferably $\Delta T$ of from 0.1° C. to 3° C. Further, the separator for a non-aqueous electrolyte battery has, in a range of from 135° C. to 148° C., still more preferably $\Delta T$ of from 0.1° C. to 5° C., and particularly preferably $\Delta T$ of from 0.1° C. to 3° C.

With regard to the separator for a non-aqueous electrolyte battery according to the invention, a method for controlling S to exhibit the maximum value of 0.8 or more in the temperature range of from 130° C. to 155° C. is not particularly limited, and it may be achieved by controlling the type or molecular weight of polyolefin used as a raw material of a polyolefin microporous substrate.

With regard to the separator for a non-aqueous electrolyte battery according to the invention, a method for controlling $\Delta T$ to 5° C. or lower is not particularly limited, and it may be achieved by controlling the type or molecular weight of polyolefin used as a raw material of a polyolefin microporous substrate or by controlling the pore diameter and porosity of the polyolefin microporous substrate and heat resistant porous layer.

Controlling $\Delta T$ can be also achieved by, for example, (i) uniformizing the crystal size of polyolefin that is included in the polyolefin microporous substrate, or (ii) increasing flow rate of molten polyolefin.

The type or molecular weight of polyolefin, pore diameter and porosity of the microporous substrate and heat resistant porous layer, and the aforementioned (i) and (ii) that are related to the control described above are explained below in greater detail.

(Polyolefin Microporous Substrate)

The polyolefin microporous substrate in the invention is a porous film which has numerous micropores inside and has such a structure that the micropores are connected from one side to the other side so that gas or liquid can pass through from one side to the other side.

The polyolefin microporous substrate in the invention has a content of polyolefin having a molecular weight of 100,000 or less of from 10% by mass to 25% by mass relative to the total amount of polyolefin. The polyolefin microporous substrate is preferably a substrate that is softened at the temperature range of from 130° C. to 155° C. so that pores of porous material are closed and the shutdown function is exhibited and that is not dissolved in an electrolytic solution of the non-aqueous electrolyte secondary battery.

The thickness of the polyolefin microporous substrate is preferably from 5 μm to 25 μm, and more preferably from 5 μm to 20 μm. When the thickness of the polyolefin microporous film is 5 μm or more, a favorable shut down function is obtained. On the other hand, the thickness of 25 μm or less is suitable for the use in a separator for a non-aqueous electrolyte battery including a heat resistant porous layer, and high electric capacity can be achieved.

The pore diameter of the polyolefin microporous substrate is a pore diameter measured by a specific surface area method and is preferably from 10 nm to 150 nm, and more preferably from 30 nm to 100 nm. When the pore diameter is 10 nm or more, ion conducting property is ensured, and therefore desirable. On the other hand, when the pore diameter is 150 nm or less, retention of the electrolytic solution in the microporous substrate improves, and therefore advantageous. When the pore diameter is 150 nm or less, good shut down responsiveness is obtained. The pore diameter of the polyolefin microporous substrate is, from the viewpoint of controlling $\Delta T$ to $5°$ C. or lower, preferably from 10 nm to 150 nm, and more preferably from 30 nm to 100 nm.

The porosity of the polyolefin microporous substrate is preferably from 20 to 60%, and more preferably from 30 to 60%. When the porosity is 20% or more, the permeability and the electrolytic solution retention amount are obtained at an appropriate level. On the other hand, the porosity of 60% or less is preferable in terms of mechanical strength of the polyolefin microporous substrate, and good shut down responsiveness is obtained. The porosity of the polyolefin microporous substrate is, also from the viewpoint of controlling $\Delta T$ to $5°$ C. or lower, preferably from 20 to 60%, and more preferably from 30 to 60%.

The method for controlling pore diameter and porosity of the polyolefin microporous substrate is not particularly limited. Specifically, the controlling of pore diameter and porosity of the polyolefin microporous substrate may be achieved by controlling the molecular weight distribution and branch structure of polyolefin that is used as a raw material, the ratio between polyolefin and a plasticizer, drawing conditions, annealing conditions, or the like.

The method for measuring pore diameter and porosity is described in detail in Examples.

From the viewpoint of balancing between the mechanical strength and the film resistance as a member of a separator, the Gurley value (JIS P8117) of the polyolefin microporous substrate is preferably from 50 sec/100 cc to 500 sec/100 cc.

From the viewpoint of the load characteristics of non-aqueous electrolyte secondary battery, the film resistance of the polyolefin microporous film at room temperature (e.g., $20°$ C.) is preferably from 0.5 ohm·cm² to 5 ohm·cm².

The thrust resistance of the polyolefin microporous film is preferably 250 g or higher. When the thrust resistance is 250 g or higher, when a non-aqueous electrolyte secondary battery is produced, damages such as pinholes or the like are less likely to occur in a separator even with irregularities of an electrode, shocks or the like, and thus, the possibility of having a short circuit of non-aqueous electrolyte secondary batteries is low.

The polyolefin microporous substrate preferably has, in both the MD direction and the TD direction, a breaking strength of 10 N or higher and an elongation at break is greater than 50%. When the breaking strength and the elongation at break are within the ranges, the separator is less likely to break during winding of the separator in manufacturing the non-aqueous electrolyte secondary battery, and also the shut down cycle property is not easily changed, and therefore advantageous.

[Polyolefin]

Examples of the polyolefin resin contained in the polyolefin microfibrous substrate include a polymer (homopolymer, copolymer, multi-stage polymer or the like) obtained by polymerization of monomer(s) such as ethylene, propylene, 1-butene, 4-methyl-1-pentene, 1-hexane, and 1-octene.

Examples of the polyolefin resin include a low density polyethylene having density of lower than 0.93 g/cm³, a linear low density polyethylene, a medium density polyethylene having density of 0.93 to 0.94 g/cm³, a high density polyethylene having density of higher than 0.94 g/cm³, and a polyethylene obtained polymerizing using a metallocene catalyst (herein below, also referred to as "metallocene polyethylene"), isotactic polypropylene, atactic polypropylene, polybutene, and ethylene propylene rubber.

The polyolefin resin may be used either singly or in combination of two or more.

According to the invention, under the purpose of control to have the maximum value of S of 0.8 or more in the temperature range of from $130°$ C. to $155°$ C., the content of polyolefin having a molecular weight of 100,000 or less relative to the total amount of polyolefin included in the polyolefin microporous substrate is from 10 to 25% by mass. When the content is not within the range, it is not easy to control to have the maximum value of S of 0.8 or more in the temperature range of from $130°$ C. to $155°$ C.

From the viewpoint of control to have the maximum value of S of 0.8 or more in the temperature range of from $130°$ C. to $155°$ C. and of controlling $\Delta T$ to $5°$ C. or lower, the content is preferably from 11 to 23% by mass, and more preferably from 15 to 20% by mass. The polyolefin having molecular weight of 100,000 or less is herein below referred to as "low molecular weight polyolefin."

In the polyolefin microporous substrate, polyolefin having little branching and having a molecular weight of more than 100,000 but 1,000,000 or less (in this paragraph, referred to as a "high density polyolefin") and polyolefin having a molecular weight of more than 500,000 (in this paragraph, referred to as a "ultra high molecular weight polyolefin") can be included in addition to a low molecular weight polyolefin. As a raw material of the polyolefin microporous substrate, a polyolefin mixture in which the low molecular weight polyolefin, and at least one of the high density polyolefin and the ultra high molecular weight polyolefin are mixed is preferable.

From the viewpoint of controlling the maximum value of 5 to 0.8 or more in the temperature range of from $130°$ C. to $155°$ C. and controlling $\Delta T$ to $5°$ C. or lower, the weight average molecular weight (Mw) (Dalton) of the polyolefin mixture is preferably from 400,000 to 2,000,000, more preferably from 420,000 to 1,500,000, and still more preferably from 450,000 to 1,200,000.

The weight average molecular weight of the polyolefin mixture indicates the molecular weight that is measured by gel permeation chromatography (herein below, also referred to as "GPC") and calibrated with reference to polystyrene.

As a raw material of the polyolefin microporous substrate, polyolefin having distribution of from 10 to 25% by mass at a lower molecular weight side of a molecular weight of 100,000 or less can be used as it is. It is also possible that polyolefin having a molecular weight of 100,000 or less is added to polyolefin having distribution of less than 10% at a low molecule side of a molecular weight of 100,000 or less to modify the molecular weight distribution, and the resulting product is used as a raw material. When a low molecular weight polyolefin is added, the molecular weight of the low molecular weight polyolefin to be added is preferably from 1000 to 100,000, more preferably from 10,000 to 100,000, and still more preferably from 50,000 to 100,000.

The molecular weight (Dalton) of polyolefin is a molecular weight that is measured by GPC and calibrated with reference to polystyrene.

From the viewpoint of improving mechanical properties of the polyolefin microporous substrate and/or separator (for example, breaking strength and scratch resistance), the weight average molecular weight (Mw) (Dalton) of the polyolefin resin is preferably 50,000 or more, and more preferably 100,000 or more. Having the weight average molecular weight of 50,000 or more is preferable from the viewpoint of ensuring good film forming property by maintaining melt tension at high level at the time of thermal elongation and from the viewpoint of increasing strength of polyolefin microporous substrate by introducing sufficient tangling.

Meanwhile, the upper limit of the weight average molecular weight of polyolefin resin is preferably 10,000,000 or less, and more preferably 3,000,000 or less. Having the weight average molecular weight of 10,000,000 or less is preferable from the viewpoint of enhancing molding property of a sheet, in particular thickness stability, by enabling preparation of a homogeneous solution when preparing a solution. Having the weight average molecular weight of 3,000,000 or less is preferable from the viewpoint of enhancing uniformity during molding and lowering tension involved with elongation.

Here, by using polyolefins with different molecular weight in combination, for example polyolefin having a relatively low weight average molecular weight and polyolefin having a relatively high weight average molecular weight in combination (specifically, combined use of a high density polyethylene having a weight average molecular weight of from 100,000 to 400,000 and au ultra high molecular weight polyethylene having a weight average molecular weight of more than 400,000), various points described above can be controlled, and it is also preferable that the molecular weight is suitably selected depending on purpose. When a high density polyethylene having a weight average molecular weight of from 100,000 to 400,000 and an ultra high molecular weight polyethylene having a weight average molecular weight of more than 400,000 are used in combination, the mass ratio between the former and the latter (that is, former:latter) is preferably from 50:50 to 90:10, more preferably from 60:40 to 80:20, and still more preferably from 65:35 to 75:25.

From the viewpoint of the film forming property and elongation property of the polyolefin microporous substrate, the content of the ultra high molecular weight polyethylene having a weight average molecular weight of 700,000 or more (in particular, from 800,000 to 3,000,000) is preferably 90% by mass or less.

When two or more polyolefin resins are used, the weight average molecular weight described in this paragraph indicates the value measured for each polyolefin resin.

In the invention, from the viewpoint of controlling the maximum value of 5 to 0.8 or more in the temperature range of from 130° C. to 155° C. and controlling ΔT to 5° C. or lower, polyethylene is preferred among the polyolefin resins and the low molecular weight polyolefin included in the polyolefin microporous substrate is preferably a polyethylene having a molecular weight of 100,000 or less.

The polyolefin microporous substrate preferably has a polyethylene content of 90% by mass or more relative to the total amount polyolefin. When the content is 90% by mass or more, controlling the maximum value of 5 to 0.8 or more in the temperature range of from 130° C. to 155° C. and controlling ΔT to 5° C. or lower are easy to achieve. Further, when the content is 90% by mass or more, it is easy to perform uniform kneading before making a film, and thus a microporous film having less marks and defects can be easily produced. The content is more preferably 92% by mass or more, and still more preferably 95% by mass or more.

From the viewpoint of ensuring molding property, heat resistance, and mechanical strength of microporous substrate, the polyolefin microporous substrate may contain a polypropylene resin.

According to the invention, from the viewpoint of controlling ΔT to 5° C. or lower, the following constitutions of (i) and/or (ii) may be preferably adopted for the polyolefin.

(i) Uniformizing Crystal Size of Polyolefin Included in the Polyolefin Microporous Substrate To control ΔT to 5° C. or lower, it may be considered to uniformize the crystal size of polyolefin used in the polyolefin microporous substrate. Uniformizing the crystal size can be achieved by controlling elongation condition or heat treatment temperature for the polyolefin microporous substrate. Uniformizing the crystal size is facilitated using a nucleating agent for crystallization. At that time, improving the crystallinity of polyolefin is preferable from the viewpoint of improving mechanical properties and short circuit resistance of the polyolefin microporous substrate and also preventing liquid dryness of a battery device.

As a nucleating agent for crystallization, a conventionally known nucleating agent for crystallization can be used without particular limitation. Examples of the commercially available product include "GEL ALL D" (manufactured by New Japan Chemical Co., Ltd.), "ADKSTAB" (manufactured by ADEKA CORPORATION), and "IRGACLEAR D" (manufactured by Ciba Specialty Chemicals). Examples of a commercially available master batch include "RIKEMASTER" (manufactured by Riken Vitamin Co., Ltd.). Further examples include a sorbitol-based nucleating agent such as dibenzylidene sorbitol (DBS) compounds, 1,3-O-bis(3,4-dimethylbenzylidene)sorbitol, dialkyl benzylidene sorbitol, diacetal of sorbitol having at least one chlorine or bromine substituent, di(methyl or ethyl substituted benzylidene)sorbitol, and bis(3,4-diallyl benzylidene)sorbitol having a substituent which forms a carbon ring; aliphatic, alicyclic, and aromatic monocarboxylic acid and polycarboxylic acid, and anhydrides thereof; metal salt compounds of organic acid; and cyclic bis-phenol phosphate.

The addition amount of the nucleating agent for crystallization is, relative to the mass of the polyolefin resin, preferably from 0.001 to 5% by mass, more preferably from 0.01 to 4% by mass, and still more preferably from 0.05 to 3% by mass.

(Ii) Increasing Flow Rate of Polyolefin Melt Solution

Increasing flow rate of polyolefin melt solution can be achieved by increasing a low molecular weight component and also by increasing a low melt viscosity component. However, according to such method, mechanical properties and short circuit resistance of the polyolefin microporous substrate may be impaired, and therefore a measure for achieving both properties is required.

Examples of the low melt viscosity component include a low molecular weight polyolefin, a low density polyolefin having many side chains (for example, a copolymer having a relatively long side chain components obtained by polymerizing using a metallocene catalyst, for example, α-olefinic copolymer).

[Method for Producing Polyolefin Microporous Substrate]

The production method of the polyolefin microporous substrate is not particularly limited, but, specifically, the polyolefin microporous substrate is preferably produced through the following processes (1) to (6). The polyolefin used as a raw material is as described above.

(1) Preparation of Polyolefin Solution

A polyolefin solution in which raw materials such as polyolefin at pre-determined amount ratio are dissolved in a solvent is prepared. It is also possible to add a solvent to prepare a polyolefin solution. Examples of the solvent include paraffin, fluid paraffin, paraffin oil, mineral oil, castor oil, tetralin, ethylene glycol, glycerin, decaline, toluene, xylene, diethyltriamine, ethyldiamine, dimethyl sulfoxide, and hexane.

The concentration of the polyolefin solution is preferably from 1 to 35% by mass, and more preferably from 10 to 30% by mass. When the concentration of polyolefin solution is 1% by mass or higher, a gel phase product obtained by cold gellation is hard to deform since it can be maintained so as not to highly swell by the solvent, which provides good handling properties. On the other hand, when the concentration of polyolefin solution is 35% by mass or lower, the discharge amount can be maintained since the pressure during extrusion can be restrained, which provides excellent productivity. Also, orientation in the extrusion process is less likely to proceed, which has advantage in securing drawability or uniformity.

For removing any foreign materials, the polyolefin solution is preferably filtered. The filtering device, shape of the filter, and filtering mode are not particularly limited, and conventionally known device and mode can be used. Pore diameter of filter is preferably from 1 μm to 50 μm from the viewpoint of filtration property and productivity.

(2) Extrusion of Polyolefin Solution

The prepared polyolefin solution is kneaded with a single screw extruder or a twin-screw extruder, and extruded at a temperature equal to or greater than the melting point and equal to or lower than +60° C. of the melting point, through a T-die or I-die. Here, a twin-screw extruder is preferably employed. Further, the twin-screw extrude may be equipped with, in addition to a main inlet for feeding materials, a multiple inlets for divided feeding of several raw materials, and also a so called side feeder and a check valve and used. At the time of extrusion, to control orientation property and crystalline property, it is also possible to additionally carry out drafting at a ratio 1 to 20 times in the direction of mechanical axis.

Subsequently, the polyolefin solution extruded from the die is allowed to pass through a chill roll or a cooling bath to form a gel phase product. In this case, it is preferred that the product be quickly quenched to a temperature below the gellation temperature to be gelled. In particular, when a volatile solvent and a nonvolatile solvent are used in combination, and also from the viewpoint of controlling crystal parameters when a nucleating agent for crystallization is used in combination, it is preferred that the cooling rate of the gel phase product is 30° C./min or higher.

(3) Solvent Removal Treatment

Next, the solvents are removed from the gel phase product. When a volatile solvent is used, the solvent can be removed from the gel phase product by drying by heating or the like which is also served as a pre-heating treatment. When a nonvolatile solvent is used, the solvent can be removed by, for example, squeezing out by applying a pressure. It is not necessary to completely remove the solvents.

(4) Drawing of Gel Phase Product

After the solvent removal treatment, the gel phase product is drawn. Here, prior to the drawing, a relaxing treatment may be performed. In the drawing treatment, the gel phase product is heated, and biaxially drawn at a predetermined ratio using a general tenter method, a roll method, a rolling method or a combination thereof. The biaxial drawing may be performed in a simultaneous manner or a sequential manner. The drawing may be performed in longitudinal multistep, or three- or four-step drawing.

From the viewpoint of drawability or the like, the drawing temperature is preferably 90° C. or higher and less than the melting point of the polyolefin which is used for film forming, and more preferably from 100° C. to 120° C. Further, from the viewpoint of increasing the number of fine crystallites with uniform size, the heating temperature is preferably close to the crystal melting temperature of gel phase product, within the range not exceeding the melting temperature of gel phase product and melting point of polyolefin. When the heating temperature is lower than the melting point, the gel phase product is less likely to melt, which enables to perform good drawing. When the heating temperature is 90° C. or higher, the gel phase product softens sufficiently and it is possible to perform drawing at a high ratio without a film breakage during drawing.

The drawing ratio varies depending on the thickness of the original material to be drawn, and is at least two times or larger, and preferably from 4 to 20 times in one axis direction, to control the crystal size, distribution of crystal size, and crystallinity or the like. In particular, from the viewpoint of purpose of the invention and enhancing production efficiency, it is preferred that the drawing ratio be from 4 to 10 times in the machine direction (that is, MD direction), and from 6 to 15 times in the direction perpendicular to the machine direction (that is, TD direction). In terms of area magnification ratio, it is preferably from 10 to 100 times, more preferably from 20 to 80 times, and still more preferably from 30 to 60 times.

Further, according to the purpose of the invention, the drawing rate is preferably 200%/sec or less. From the viewpoint of productivity, the drawing rate is 1%/sec or more. More preferably, it is 5%/sec to 150%/sec, and still more preferably 10%/sec to 100%/sec.

(5) Extraction and Removal of Solvent

The gel phase product after drawing is immersed in an extraction solvent to extract a solvent. Examples of the extraction solvent include volatile solvents such as hydrocarbons such as pentane, hexane, heptane, cyclohexane, decaline, and tetralin, chlorinated hydrocarbons such as methylene chloride, carbon tetrachloride, and methylene chloride, fluorohydrocarbons such as trifluoroethane, and ethers such as diethyl ether and dioxane. These solvents are appropriately selected depending on the solvent which is used for dissolving the polyolefin resin, and it may be used either singly or in combination. As for the extraction of the solvent, the solvent in the microporous substrate is removed to obtain a concentration of less than 1% by mass.

(6) Annealing of Microporous Substrate

The microporous substrate is subjected to heatsetting by annealing. From the viewpoint of suppressing thermal shrinkage of the microporous substrate and suppressing the temperature width of shut down, about 0 to about 30% of shrinkage and/or drawing may be applied under stress condition. The annealing temperature is preferably from 80° C. to 150° C. Further, in order to increase the number of crystallite, the annealing is preferably carried out at the temperature of from 80° C. to 140° C., and more preferably at the temperature of from 90° C. to 135° C. Form the viewpoint of lowering the thermal shrinkage ratio of the microporous substrate, the annealing time is preferably 1 min or more, and the annealing time may be 1 min to 1 hour. From the viewpoint of suppressing distortion of a microporous substrate, it is preferable that annealing is carried out for a long period of time. Further, in order to further reduce thermal shrinkage of microporous substrate, the annealing time may be extended to a time period of 1 hour to 5 hours or so.

(Heat Resistant Porous Layer)

The heat resistant porous layer of the invention means a layer having numerous micropores inside and has such a structure that the micropores are connected from one side to the other side so that a gas or a liquid can pass through from one side to the other surface.

The heat resistant porous layer may be disposed on at least one side of the polyolefin microporous substrate, but it is more preferred that the heat resistant porous layer is disposed on both sides of the polyolefin microporous substrate from the viewpoint of handling property and durability of the separator and an effect of inhibiting thermal shrinkage.

For a case in which the heat resistant porous layer is disposed on both sides of the polyolefin microporous substrate, the total thickness of the heat resistant porous layer is preferably from 3 µm to 12 µm. For a case in which the heat resistant porous layer is disposed on one side of the polyolefin microporous substrate, the thickness of the heat resistant porous layer is preferably from 3 µm to 12 µm. Such thickness range is preferred from the viewpoint of handling property, durability, mechanical strength, an effect of suppressing thermal shrinkage and causing less incidence of liquid drying.

Further, the total thickness of the heat resistant porous layer is preferably 10 to 80% of the thickness of the polyolefin microporous substrate. When the thickness of the heat resistant porous layer is within the range, good short circuit resistance and good shut down efficiency are obtained. The total thickness of the heat resistant porous layer is more preferably from 15 to 70%, still more preferably from 20 to 60%, and particularly preferably from 25 to 50% of the thickness of the polyolefin microporous substrate.

The pore diameter of the heat resistant porous layer is a pore diameter measured by a specific surface area method, and is preferably from 50 nm to 250 nm, and more preferably from 80 nm to 200 nm, and still more preferably from 90 nm to 150 nm. When the pore diameter of the heat resistant porous layer is 50 nm or more, favorable permeability and retention amount of electrolytic solution are obtained. On the other hand, when the pore diameter of the heat resistant porous layer is 250 nm or less, favorable shut down responsiveness and also favorable short circuit resistance are obtained. From the viewpoint of controlling ΔT to 5° C. or lower, the pore diameter of the heat resistant porous layer is preferably from 50 nm to 250 nm, more preferably 80 nm to 200 nm, and still more preferably from 90 nm to 150 nm.

The porosity of the heat resistant porous layer is preferably from 30 to 90%, more preferably from 40 to 70%, and still more preferably from 50 to 70%. When the porosity of the heat resistant porous layer is 30% or higher, favorable permeability and retention amount of electrolytic solution are obtained. On the other hand, when the porosity of the heat resistant porous layer is 90% or lower, favorable shut down function responsiveness and also favorable short circuit resistance are obtained. From the viewpoint of controlling ΔT to 5° C. or lower, the porosity of the heat resistant porous layer is preferably from 30 to 90%, more preferably from 40 to 70%, and still more preferably from 50 to 70%.

The method for controlling the pore diameter and the porosity of the heat resistant porous layer is not particularly limited. Specifically, however, it may be achieved by controlling the molecular weight distribution or the content of heat resistant polymer used as a raw material, or a coagulation condition for a slurry for coating or a ratio of a poor solvent in the slurry when forming the heat resistant porous layer by a wet coating method.

The method for measurement of pore diameter and porosity is described in detail in Examples.

[Heat Resistant Polymer]

As the heat resistant polymer as a component of the heat resistance porous layer, a polymer that has a crystal melting point of 200° C. or higher, as measured by differential scanning calorimetry (herein below, it may be abbreviated as "DSC"), or has a glass transition temperature of 150° C. or higher is preferably used. Examples of the heat resistant polymer include at least one resin selected from the group consisting of wholly aromatic polyamide, polyimide, polyamide imide, polysulfone, polyether sulfone, polyketone, polyether ketone, polyether imide, and cellulose.

The heat resistant polymer (herein below, also referred to as a "heat resistant resin") may be a homopolymer. The heat resistant polymer may contain, depending on desired properties such as exhibiting flexibility or the like, a slight amount of a copolymerization component. That is, for example, a small amount of aliphatic component can be copolymerized into a wholly aromatic polyamide.

Further, from the viewpoint of insolubility in a electrolytic solution and high durability, wholly aromatic polyamides are preferable for a heat resistant resin, and from the viewpoint of easiness of forming a porous layer and excellence in oxidation and reduction resistance with regard to an electrode reaction, polymethaphenylene isophthalamide and polyparaphenylene terephthalamide, which are a meta type wholly aromatic polyamide, are more preferable. Polymethaphenylene isophthalamide is particularly preferable.

From the viewpoint of electrochemical stability, it is preferable that, in polymethaphenylene isophthalamide, the terminal molecular structure consists of a carboxyl group and an amino group, the concentration of carboxyl group is from 30 to 70 eqv./ton of the polymer, the concentration of amino group is from 30 to 70 eqv./ton of the polymer, and a part of the carboxyl groups, specifically, from 10 to 40 eqv./ton of the polymer, is converted into carboxylic acid salt groups.

The molecular weight of the heat resistant polymer as a component of the heat resistant porous layer is, for example, in the case of polymethaphenylene isophthalamide, preferably from 5000 to 300,000, more preferably from 10,000 to 250,000, still more preferably from 10,000 to 200,000, and particularly preferably from 15,000 to 150,000 in terms of the weight average molecular weight (Mw) (Dalton). The content (% by mass) of molecules having a molecular weight (Ms) (Dalton) of 1,000,000 or more is preferably from 10 to 30% by mass. When the content of molecules having a Mw of 300,000 or less and Ms of 1,000,000 or more is 30% by mass or less, the slurry for coating can be easily prepared and uniformity of the heat resistant porous layer is favorable when the heat resistant porous layer is formed by coating method. When the content of molecules having Mw of 5,000 or more and Ms of 1,000,000 or more is 10% by mass or more, favorable mechanical properties are obtained.

The weight average molecular weight (Mw) and the molecular weight (Ms) are the molecular weight as measured by GPC and is expressed as a polystyrene equivalent molecular weight.

[Inorganic Filler]

The heat resistant porous layer preferably includes an inorganic filler. The inorganic filler is not particularly limited and specific examples thereof which can be preferably used include metal oxides such as alumina, titania, silica and zirconia; metal carbonates such as calcium carbonate; metal phosphates such as calcium phosphate; and metal hydroxides such as aluminum hydroxide and magnesium hydroxide. From the viewpoint of elution of impurities and the durability, such an inorganic filler is preferably highly crystalline.

As the inorganic filler, those which undergo an endothermic reaction at a temperature of from 200° C. to 400° C. are preferred. In a non-aqueous electrolyte secondary battery, heat generation accompanied by decomposition of a positive electrode is thought to be the most dangerous, and the decomposition occurs at about 300° C. For this reason, when the temperature at which the endothermic reaction occurs is in the range of from 200° C. to 400° C., it is effective for preventing the heat generation of the non-aqueous electrolyte secondary battery.

Examples of the inorganic filler which undergoes an endothermic reaction in a temperature range of from 200° C. to 400° C. include an inorganic filler that is a metal hydroxide, a borate compound, a clay mineral or the like. Specific examples of such inorganic filler include aluminum hydroxide, magnesium hydroxide, calcium aluminate, dawsonite, and zinc borate. Aluminum hydroxide, dawsonite and calcium aluminate each undergo a dehydration reaction at a temperature of from 200° C. to 300° C.; and magnesium hydroxide and zinc borate each undergo an dehydration reaction at a temperature of from 300° C. to 400° C. Therefore, at least one of these inorganic fillers is preferably used. Among them, from the viewpoint of flame resistance improving effect, handling properties, charge removal effect and battery durability improving effect, metal hydroxides are preferred, and particularly, aluminum hydroxide or magnesium hydroxide is preferred.

The inorganic fillers may be used either singly or two or more of them may be used in combination. These flame resistant inorganic fillers can be used by mixing as appropriate with another inorganic filler, for example, any one of metal oxides such as alumina, zirconia, silica, magnesia and titania; metal nitrides; metal carbides; and metal carbonates.

In the present invention, from the viewpoint of electrochemical stability, short circuit resistance at a high temperature and molding property or the like of the separator for a non-aqueous electrolyte battery, the average particle diameter of the inorganic filler is preferably from 0.1 μm to 2 μm. More preferably, from the above-described viewpoint, it is from 0.1 μm to 1.5 μm, and still more preferably from 0.15 μm to 1 μm.

From the viewpoint of heat resistance improving effect, permeability and handling properties, the content of the inorganic filler in the heat resistant porous layer is preferably from 50 to 95% by mass.

When the heat resistant porous layer is microporous film-shaped, the inorganic filler in the heat resistant porous layer may exist in a state where the inorganic filler is trapped in the heat resistant resin; and when the heat resistant porous layer is a nonwoven fabric or the like, the inorganic filler in the heat resistant porous layer may exist in the constituent fibers or may be fixed on the surface of the nonwoven fabric or the like by a binder such as a resin.

[Method of Forming Heat Resistant Porous Layer]

The method of forming a heat resistant porous layer is not particularly limited, and the heat resistant porous layer can be preferably formed, for example, through the following processes (1) to (5).

In order to fix a heat resistant porous layer on a substrate, the method in which the heat resistant porous layer is formed directly on the substrate by wet coating is preferred. Other methods such as a method in which a sheet of a separately produced heat resistant porous layer is adhered to a substrate by an adhesive or the like, or a method of thermal fusing or pressure bonding can be used.

(1) Production of Slurry for Coating

A heat resistant resin is dissolved in a solvent to produce a slurry for coating. Although the solvent may be any solvent as long as the solvent dissolves the heat resistant resin and, not being particularly limited, specifically, a polar amide solvent or polar urea solvent is preferred, and examples thereof include dimethyl sulfoxide, N,N-dimethyl formamide, N,N-dimethyl acetamide, N-methyl-2-pyrrolidone, and tetramethyl. In addition to the polar solvent, a solvent which is a poor solvent to the heat resistant resin may also be used. By using such a poor solvent, a micro phase separation structure is induced, which facilitates having a porous structure when the heat resistant porous layer is formed. As the poor solvents, alcohols are preferable, and particularly, polyhydric alcohols such as glycols are preferable.

The concentration of the heat resistant resin in the slurry for coating is preferably 4 to 9% by mass. As necessary, an inorganic filler is dispersed, and a slurry for coating is obtained. For dispersing the inorganic filler in the slurry for coating, when the dispersibility of the inorganic filler is not favorable, a method for improving the dispersibility by the surface treatment of the inorganic filler by a silane coupling agent or the like is also applicable.

(2) Slurry Coating

A slurry is coated on a surface of at least one side of the polyolefin microporous substrate. When the heat resistant porous layers are formed on both sides of the polyolefin microporous substrate, from the viewpoint of shortening the process, it is preferred that the heat resistant porous layers are coated on both sides of the substrate at the same time. Examples of a method of coating the slurry for coating include a knife coater method, a gravure coater method, a Meyer bar method, a die coater method, a reverse roll coater method, a roll coater method, a screen printing method, an inkjet method and a spray method. Among these, from the viewpoint of forming the coating layer uniformly, the reverse roll coater method is suitable. When the heat resistant porous layers are coated on both sides of the polyolefin microporous substrate at the same time, for example, a method can be used in which the substrate is allowed to pass between a pair of Meyer bars to apply an excess amount of the slurry for coating on both sides of the substrate, and a precise weighing is performed by allowing the resulting product to pass between a pair of reverse roll coater to scrape an excess amount of slurry.

The slurry for coating is preferably filtered before coating, in order to remove any fine foreign materials. The filtering device, shape of the filter, and position for installment are not particularly limited, and a conventionally known device and filter can be used at a predetermined position. The pore diameter of the filter is preferably 1 μm to 100 μm from the viewpoint of filtration property and productivity.

(3) Coagulation of Slurry

The polyolefin microporous substrate coated with the slurry for coating is treated with a coagulation liquid capable of coagulating a heat resistant resin, whereby the heat resistant resin is coagulated to form a heat resistant porous layer.

Examples of a method of treating with a coagulation liquid include a method in which a coagulation liquid is sprayed onto the surface on which slurry for coating has been coated, and a method in which a polyolefin microporous substrate coated with a slurry for coating is immersed in a bath containing a coagulation liquid (coagulation bath). Here, In a case where a coagulation bath is installed, the coating bath is preferably installed at a downward position with respect to the coating apparatus.

The coagulation liquid is not particularly limited as long as the heat resistant resin can be coagulated, and is preferably water or a mixture obtained by mixing a solvent used for the slurry with an appropriate amount of water. Here, from the viewpoint of coagulation efficiency and causing porosity, the amount of water to be mixed is preferably from 40 to 90% by mass, more preferably from 50 to 80% by mass, still more preferably from 60 to 80% by mass, and particularly preferably from 65 to 80% by mass based on the coagulation liquid.

(4) Removal of Coagulation Liquid

The coagulation liquid used for the coagulation of the slurry is removed by washing with water.

(5) Drying

Water is removed by drying from a sheet of the polyolefin microporous substrate on which a heat resistant resin coating layer is formed. The method of drying is not particularly limited, and the drying temperature is preferably from 50 to 90° C. In order to avoid generating a dimension change due to thermal shrinkage, a method of allowing being in contact with a roll or a method of clamping both ends of a separator using a chuck or the like is preferably applied. By suppressing distortion in the MD direction and in the TD direction during drying treatment, it is possible to crystallize uniformly the heat resistant porous layer with even thickness and thus various physical properties are desirably obtained.

From the viewpoint of thermal shrinkage ratio of a separator, the time for drying treatment is selected from the range of, preferably from 2 min to 5 hours, and more preferably 5 min to 3 hours.

The heat treatment for drying can be preferably performed under an atmosphere with pressure equal to or lower than normal pressure. For such case, the treatment time may be suitably selected from a range of from 1 min to 10 hours.

(Various Properties of Separator)

From the viewpoint of energy density of the non-aqueous electrolyte secondary battery, the separator for a non-aqueous electrolyte battery according to the invention preferably has the total film thickness of 30 μm or lower.

The porosity of the separator for a non-aqueous electrolyte battery is preferably from 30 to 70%, and more preferably from 40 to 60% from the viewpoint of permeability, mechanical strength, and handling properties. When the porosity is 30% or more, permeability and the electrolytic solution retention amount are obtained at an appropriate level. On the other hand, when the porosity is 70% or less, it is desirable in terms of mechanical strength, and also good shut down responsiveness and good short circuit resistance are obtained.

From the viewpoint of improved balancing between the mechanical strength and the film resistance, the Gurley value (JIS P8117) of the separator for a non-aqueous electrolyte battery is preferably from 100 sec/100 cc to 500 sec/100 cc.

From the viewpoint of the load characteristics of non-aqueous electrolyte secondary battery, the film resistance of the separator for a non-aqueous electrolyte battery at room temperature (e.g., 20° C.) is preferably from 1.5 ohm·cm$^2$ to 10 ohm·cm$^2$.

The thrust resistance of the separator for a non-aqueous electrolyte battery is preferably from 250 g to 1000 g. When the thrust resistance is 250 g or higher, damages such as pinholes or the like in the separator are less likely to occur even with irregularities of an electrode, shock or the like when a non-aqueous electrolyte secondary battery is produced, and thus, the possibility of having a short circuit of the non-aqueous electrolyte secondary batteries is low.

The separator for a non-aqueous electrolyte battery preferably has, in both the MD direction and the TD direction, a breaking strength of 10 N or higher and an elongation at break of 50% or higher. When the breaking strength is 10N or higher and the elongation at break is 50% or higher, the separator is less likely to break during winding the separator in manufacturing the non-aqueous electrolyte secondary battery.

The thermal shrinkage ratio at 105° C. of the separator for a non-aqueous electrolyte battery is preferably from 0.5 to 10%. When the thermal shrinkage ratio is within the range, the separator for a non-aqueous electrolyte battery has a balance between shape stability and shut down property. The thermal shrinkage ratio at 105° C. of the separator for a non-aqueous electrolyte battery is more preferably from 0.5 to 5%.

<Non-Aqueous Electrolyte Secondary Battery>

The non-aqueous electrolyte secondary battery of the invention is a non-aqueous electrolyte secondary battery which obtains an electromotive force through doping and dedoping of lithium, and the non-aqueous electrolyte secondary battery of the invention includes a positive electrode, a negative electrode, and the separator for a non-aqueous electrolyte battery according to the invention. The non-aqueous electrolyte secondary battery has such a structure that a battery element in which a negative electrode and a positive electrode face each other via a separator is impregnated with an electrolytic solution, which is encapsulated in an outer package.

The non-aqueous electrolyte secondary battery with such constitution has excellent shut down responsiveness and excellent short circuit resistance, and therefore it has high safety at the time of use.

The negative electrode has such a structure that a negative electrode mixture including a negative electrode active substance, an electroconductive aid and a binder is formed on a current collector. Examples of the negative electrode active substance include a material capable of electrochemically doping lithium, and specific examples thereof include a carbon material, silicon, aluminum, tin and a wood alloy. From the viewpoint of less occurrence of liquid dryness in a separator, the negative electrode active substance preferably has volume change ratio of 3% or more during lithium dedoping process. Examples of the negative electrode active substance include Sn, SnSb, Ag$_3$Sn, artificial graphite, graphite, Si, SiO, and V$_5$O$_4$. Examples of the electroconductive aid include a carbon material, such as acetylene black and Ketjen black. The binder is an organic polymer, for example. Examples thereof include polyvinylidene fluoride and carboxymethyl cellulose. As the current collector, a copper foil, a stainless steel foil, a nickel foil or the like may be used.

The positive electrode has such a structure that a positive electrode mixture including a positive electrode active substance, an electroconductive aid and a binder is formed on a current collector. Examples of the positive electrode active substance include a lithium-containing transition metal oxide, and specific examples thereof include $LiCoO_2$, $LiNiO_2$, $LiMn_{0.5}Ni_{0.5}O_2$, $LiCo_{1/3}Ni_{1/3}Mn_{1/3}O_2$, $LiMn_2O_4$, $LiFePO_4$, $LiCo_{0.5}Ni_{0.5}O_2$, and $LiAl_{0.25}Ni_{0.75}O_2$. From the viewpoint of less occurrence of liquid dryness in a separator, the positive electrode active substance preferably has volume change ratio of 1% or more during lithium dedoping process. Examples of such positive electrode active substance include $LiMn_2O_4$, $LiCoO_2$, $LiNiO_2$, $LiCo_{0.5}Ni_{0.5}O_2$, and $LiAl_{0.25}Ni_{0.75}O_2$. Examples of the electroconductive aid include a carbon material, such as acetylene black and Ketjen black. The binder is an organic polymer, for example. Examples thereof include polyvinylidene fluoride. As the current collector, an aluminum foil, a stainless steel foil, a titanium foil and the like may be used.

The electrolytic solution is a solution in which a lithium salt is dissolved in a non-aqueous solvent. Examples of the lithium salt include $LiPF_6$, $LiBF_4$ and $LiClO_4$. Examples of the non-aqueous solvent include propylene carbonate, ethylene carbonate, dimethyl carbonate, diethyl carbonate, ethyl methyl carbonate, γ-butyrolactone, and vinylene carbonate, which may be used either singly or after mixing.

Examples of the outer package material include a metallic can and an aluminum laminated package. The shape of the battery may be a rectangular shape, a cylinder shape, a coin shape or the like. The separator for a non-aqueous electrolyte battery according to the invention may be applied to have any shape.

EXAMPLES

Herein below, the invention is explained in greater detail in view of the following examples. However, the materials, use amount, ratio, treatment order, or the like described in the following Examples may be appropriately modified as long as they are within the spirit of the invention. Thus, it is not intended to limitedly interpret the scope of the invention based on the specific examples given below.

The measurement methods that are used in the Examples of the invention and the Comparative Examples are as described below.

(1) Molecular Weight Analysis of Polyolefin

The weight average molecular weight and the molecular weight distribution (% by mass) of the polyolefin were measured by gel permeation chromatography (GPC).

To 15 mg of a sample, 20 ml of a mobile phase for GPC measurement was added to dissolve the sample completely at 145° C., and then the resultant was filtrated through a stainless steel sintered filter (pore diameter: 1.0 μm). 400 μl of the filtrate was injected into the apparatus to be subjected to a measurement, and the weight average molecular weight and the molecular weight distribution of the sample were determined.

Apparatus: Gel Permeation Chromatograph Alliance GPC2000 (manufactured by Waters)
Column: TSKgel GMH6-HTx2+TSKgel GMH6-HTx2, manufactured by Tosoh Corporation
Column temperature: 140° C.
Mobile phase: o-dichlorobenzene
Detector: Differential refractive index detector (RI)
Standard material for molecular weight calibration: mono-dispersed polystyrene manufactured by Tosoh Corporation Further, the content A (%) of polyolefin having a molecular weight of 100,000 or less relative to the polyolefin amount was obtained from the results of GPC based on the following equation.

$$A=\{(\Sigma MiNi \text{ for molecular weight of } 100{,}000 \text{ or less})/(\Sigma MiNi \text{ for total molecular weight})\}\times 100$$

In the equation, Mi means the molecular weight and Ni means frequency corresponding to Mi (i.e., a value which corresponds to the height in the GPC chart). Specifically, from the GPC chart, the sum of the products between each molecular weight and corresponding frequency is obtained for entire molecular weight (i.e., total integral value), and also from the GPC chart, the sum of the product between each molecular weight and corresponding frequency is obtained for the portion with the molecular weight of 100,000 or less (i.e., integral value for the molecular weight of 100,000 or less), and the integral value for the molecular weight of 100,000 or less is divided by the total integral value, and then the resulting value is multiplied by 100.

(2) Film Thickness

The film thickness of the polyolefin microporous substrate and that of the separator for a non-aqueous electrolyte battery were obtained by measuring 20 points with a contact type thickness meter (produced by Mitutoyo Corporation), and obtaining the average value of them. The contact probe used had a cylindrical shape with a diameter on the bottom surface of 0.5 cm.

(3) Pore Diameter

The pore diameter of the pores of the polyolefin microporous substrate and that of the heat resistant porous layer were calculated from the results of the measurement of the pore volume and the surface area based on the assumption that all pores have cylindrical shape. The methods for these calculations are described below in detail.

—Method for Measuring Specific Surface Area—

First, Using the following method (method in accordance with JIS Z 8830, i.e., so-called BET method) for measuring a specific surface area using a gas adsorption method, the specific surface area St of the separator for a non-aqueous electrolyte battery, the specific surface area Ss of the polyolefin microporous film as a substrate, and the specific surface area Sf of the inorganic filler are determined.

The specific surface area S is determined from an $N_2$ adsorption of each sample, which is obtained using $N_2$ as an adsorbent, using a BET equation represented by the following formula (P-1).

$$1/[W\cdot\{(P_0/P)-1\}]=(C-1)/(Wm\cdot C)(P/P_0)(1/(W\cdot C)) \qquad \text{Formula (P-1)}$$

In formula (P-1), P represents a pressure of gas as an adsorbent in the adsorption equilibrium, $P_0$ represents a saturated vapor pressure of the adsorbent in the adsorption equilibrium, W represents an adsorbed amount in the adsorption equilibrium pressure P, Wm represents a monomolecular adsorbed amount, and C represents a BET constant. The relative pressure $P_0/P$ is taken as the x axis value and $1/[W\cdot\{(P_0/P)-1\}]$ is taken as the y axis value to obtain a linear plot (so-called BET plot). When the slope of this plot is represented by A and the intercept is represented by B, the monomolecular adsorbed amount Wm is represented by the following formula (P-2).

$$Wm=1/(A+B) \qquad \text{Formula (P-2)}$$

Then, the specific surface area S is determined from the following formula (P-3).

$$S=(Wm \cdot N \cdot Acs \cdot M)/w \quad \text{Formula (P-3)}$$

Here, N represents an Avogadro's number, M represents a molecular weight, Acs represents an adsorption cross-section area, and w represents a sample weight. When $N_2$ is used, adsorption cross-section area Acs is $0.16 \text{ nm}^2$.

—Pore Diameter of Polyolefin Microporous Substrate—

The pore diameter of the pores of polyolefin microporous substrate is determined from the pore volume and surface area of the polyolefin microporous substrate based on the assumption that pores have cylindrical shape.

$$Vs=\pi(Rs/2)^2 Ls \quad \text{Formula (P-4)}$$

$$Vs=\epsilon s(Ws/ds+Vs) \quad \text{Formula (P-5)}$$

$$Ss \cdot Ws=\pi \cdot Rs \cdot Ls \quad \text{Formula (P-6)}$$

Vs represents the pore volume, Rs represents a pore diameter of pore, i.e., a diameter of cylinder, Ls represents a length of cylinder, Ws represents a mass of the polyolefin resin, ds represents a density of the polyolefin resin, and $\epsilon s$ represents a porosity of the polyolefin resin layer.

From the above formula (P-4) to (P-6), the pore diameter Rs of pores of the polyolefin microporous substrate can be obtained.

—Pore Diameter of Heat Resistance Microporous Layer—

Similar to the pore diameter of the pores of the polyolefin microporous substrate described above, the pore diameter of the pores of the heat resistant porous layer is determined from the pore volume and the surface area of the heat resistant porous layer based on the assumption that the pores have cylindrical shape.

When the total volume of the pores is represented by Vt, the diameter of the cylindrical pores is represented by Rt, and the total length of cylindrical pores is represented by Lt, the following formula (P-7) to (P-9) are established.

$$St \cdot (Wa+Wf+Ws)-Ss \cdot Ws=\pi \cdot Rt \cdot Lt \quad \text{Formula (P-7)}$$

$$Vt=\pi(Rt/2)^2 \cdot Lt \quad \text{Formula (P-8)}$$

$$Vt=\epsilon t \cdot (Wa/da+Wf/df+Vt) \quad \text{Formula (P-9)}$$

Here, Wa represents a mass of the heat resistant resin, da represents a density of the heat resistant resin, Wf represents a mass of the inorganic filler, df represents a density of the inorganic filler, and $\epsilon t$ represents a porosity of the heat resistant resin layer. From formula (P-7) to (P-9) above, the pore diameter Rt of the pores of the heat resistant porous layer can be obtained.

(4) Porosity

The porosity of the polyolefin microporous substrate, the porosity the heat resistant porous layer, and the porosity of the separator for a non-aqueous electrolyte battery were obtained according to the following calculation method.

When the constituent materials are a, b, c, ..., n, the masses of the constituent materials are Wa, Wb, Wc, ..., Wn (g/cm$^2$), the true densities of the individual materials are xa, xb, xc, ..., xn (g/cm$^3$), and the thickness of the layer on which the attention is paid is represented by t (cm), the porosity $\epsilon$ (%) is determined from the following formula.

$$\epsilon=\{1-(Wa/xa+Wb/xb+Wc/xc+ \ldots +Wn/xn)/t\} \times 100$$

(5) Thermal Shrinkage Ratio

With regard to the thermal shrinkage ratio of the polyolefin microporous substrate and that of the separator for a non-aqueous electrolyte battery, a sample was heated for 1 hour at 105° C., and measurement was carried out in the MD direction and the TD direction.

(6) Gurley Value

The Gurley value of the polyolefin microporous substrate and that of the separator for a non-aqueous electrolyte battery were measured according to JIS P8117.

(7) Film Resistance at Room Temperature

The film resistance at room temperature of the polyolefin microporous substrate and that of the separator for a non-aqueous electrolyte battery were measured according to the following method.

A sample was cut into a size of 2.6 cm×2.0 cm. The cut sample was immersed in a methanol (methanol: manufactured by Wako Pure Chemical Industries, Ltd.) solution in which a nonionic surfactant (manufactured by Kao Corporation; EMULGEN 210P) is dissolved at 3% by mass, and air-dried. An aluminum foil having a thickness of 20 μm was cut into 2.0 cm×1.4 cm, and a lead tab was attached thereto. Two sheets of this aluminum foil were prepared, and the sample was sandwiched between the two sheets of the aluminum foil so that the aluminum foil suffers no short circuit. The sample is impregnated with an electrolytic solution, which is a solution of 1 M LiBF$_4$/[propylene carbonate/ethylene carbonate (mass ratio 1/1)] (manufactured by Kishida Chemical Co., Ltd.). The resulting product was sealed in an aluminum laminated pack under a reduced pressure so that the tab was placed outside of the aluminum pack. Similar cells were prepared in such a manner that each cell has 1, 2, or 3 separators between the sheets of the aluminum foil. The cell was placed in a thermostatic chamber at 20° C., and a resistance of the cell was measured by an alternating current impedance method at an amplitude of 10 mV and at a frequency of 100 kHz. The measured resistance value of the cell was plotted against the number of the separator, and a slope of obtained by linear approximation of the plots was determined. The film resistance at room temperature per one separator (ohm·cm$^2$) was determined by multiplying the slope by 2.0 cm×1.4 cm, which is the electrode area.

(8) Shut Down Temperature and Shut Down Temperature Width

The shut down temperature and the shut down temperature width of the separator for a non-aqueous electrolyte battery were measured according to the following method.

First, a sample was punched into a diameter of 19 mm, and immersed in methanol (methanol: manufactured by Wako Pure Chemical Industries, Ltd.) solution in which a nonionic surfactant (manufactured by Kao Corporation; EMULGEN 210P) is dissolved at a concentration of 3% by mass, and air-dried. Then, the sample was disposed between two SUS plate electrodes (thickness: 0.4 mm and diameter: 15.5 mm) and impregnated with an electrolytic solution, which is a solution of 1 M LiBF$_4$/[propylene carbonate/ethylene carbonate (mass ratio 1/1)] (manufactured by Kishida Chemical Co., Ltd.). The resulting product was sealed in a 2032 type coin cell (diameter of 20 mm, thickness of 3.2 mm, material: stainless steel) to prepare a coin-type battery. Lead wires were connected to the inside of the battery, and a thermocouple was attached thereto.

The battery was placed in an oven. The temperature within the oven was raised at a temperature rising rate of 1.6° C./minute to raise the temperature (T) within the battery and the separator simultaneously with applying voltage between electrodes according to alternating current impedance method at an amplitude of 10 mV and at a frequency of 100 kHz, and a resistance (R) (ohm·cm$^2$) of the cell included in the battery was measured.

Then, the temperature at which the value obtained by differentiation of the common logarithmic value of the resistance (R) of the cell with the temperature (T), i.e., [d(log R)/dT], reaches the maximum value is taken as shut down temperature. Further, the temperature at which [d(log R)/dT] reaches 0.8 for the first time is taken as a "shut down initiation temperature", and the difference compared to the shutdown temperature is taken as "shut down temperature width."

The test was performed for ten samples, and as a result of obtaining average thereof, the shutdown temperature and the shut down temperature width were obtained.

Further, in order to evaluate the shut down responsiveness also for the polyolefin microporous substrate, the battery was similarly manufactured and the cell resistance was measured for obtaining the maximum value of [d(log R)/dT].

(9) Short Circuit Resistance of Battery
—Production of Battery for Test—
(Positive Electrode)

A lithium cobaltate powder (LiCoO$_2$, produced by Nippon Chemical Industrial Co., Ltd.), acetylene black, and a N-methyl-2-pyrrolidone solution of PVdF (PVdF concentration: 6% by mass) were prepared. A mixture solution was prepared to have a mass ratio of 89.5:4.5:6 (LiCoO$_2$: acetylene black:PVdF [dry mass]), which was used as a positive electrode paste. The positive electrode paste was coated on an aluminum foil having a thickness of 20 μm, and dried, followed by pressing, to provide a positive electrode with thickness of 97 μm.

(Negative Electrode)

A mesophase carbon microbeads powder (MCMB, produced by Osaka Gas Chemicals Co., Ltd.) as the negative electrode active substance, acetylene black, and a N-methyl-2-pyrrolidone solution of PVdF (PVdF concentration: 6% by mass) were prepared. A mixture solution was prepared to have a mass ratio of 87:3:10 (mesophase carbon microbeads: acetylene black:PVdF [dry mass]), which was used as a negative electrode paste. The negative electrode paste was coated on a copper foil having a thickness of 18 μm, and dried, followed by pressing, to provide a negative electrode with thickness of 90 μm.

—Production of Battery—

The positive electrode and the negative electrode were disposed to face to each other with a separator intervening therebetween. The assembly was impregnated with an electrolytic solution and encapsulated in an outer package formed of an aluminum laminated film to produce a non-aqueous secondary battery. As an electrolytic solution, 1 M LiPF$_6$/[ethylene carbonate/ethyl methyl carbonate (mass ratio 3/7)] solution (produced by Kishida Chemical Co., Ltd.) was used.

The test battery thus produced had a positive electrode area of 2×1.4 cm$^2$, a negative electrode area of 2.2×1.6 cm$^2$, and a set capacity of 8 mAh (in a range of 4.2 V to 2.75 V).

—Evaluation Method—

Ten batteries were charged to 4.2 V. The batteries were then placed in an oven, and a weight of 1.5 kg was placed on an area of 5 mmφ at the center part of outside of the batteries. In this state, the oven was set in such a manner that the temperature of the battery is increased by 2° C./minute to raise the temperature to 150° C. and then maintained for 1 hour. When two or more drastic voltage drops of battery were confirmed at near 150° C., it was determined as short circuit resistance C. When one drastic voltage drop of battery was confirmed, it was determined as short circuit resistance B. When there no drastic voltage drop of battery was confirmed, it was determined as short circuit resistance A.

In addition, with respect to the polyolefin microporous substrate, similarly to the above, batteries were manufactured and the short circuit resistance was evaluated.

Preparation of Resin

Polymerization Example 1

Polymerization for Forming Polymetaphenylene Isophthalamide by Interfacial Polymerization 160.5 g of isophthalic acid chloride was dissolved in 1,120 ml of tetrahydrofuran to prepare a solution. Separately, 85.2 g of m-phenylene diamine is dehydrated and dried with a molecular sieve, and then is dissolved in 1,120 ml of tetrahydrofuran to prepare a solution. The latter solution was gradually added in the form of thin flow to the former solution while the former solution is stirred, thereby providing a turbid milky white solution. After continuing the stirring for approximately 5 minutes, an aqueous solution obtained by dissolving 167.6 g of sodium carbonate and 317 g of sodium chloride in 3,400 ml of water was quickly added thereto while continuing the stirring, followed by further stirring for 5 minutes. The viscosity of the reaction system increased after several seconds, and thereafter, decreased, and a white suspension liquid was obtained. After allowing to stand the suspension liquid, a transparent aqueous solution layer thus separated was removed, and 185.3 g of polymetaphenylene isophthalamide (herein below, it may be also referred to as PMIA (1)) was obtained by filtration.

The weight average molecular weight (in terms of polystyrene) (Dalton) of PMIA (1) was 75,000, and the content of molecules having a molecular weight of 1,000,000 or more was 20% by mass.

Polymerization Example 2

Polymerization for Forming Polypropylene

To a 500 ml flask, 20 ml of heptane, 4 g of diethoxy magnesium, and 1.2 g of di n-butyl phthalate were added. While stirring the mixture at 90° C., 5 ml of titanium tetrachloride was added dropwise thereto and, thereafter, 110 ml of titanium tetrachloride was further added thereto. The resulting mixture was allowed to react at 110° C. over 2 hours. The resulting product thus obtained was washed with 100 ml of heptane at 80° C. Next, 115 ml of titanium tetrachloride was added and the resulting mixture was allowed to react at 110° C. for 2 hours. After the completion of the reaction, washing with heptane was carried out several times to obtain a solid catalyst component. To a 1 L autoclave, 400 ml of heptane, 1 mmol triethyl aluminum, 0.12 g of 1-allyl-3,4-diemethoxy benzene, and 5 mg of the solid catalyst component were added, followed by addition of propylene monomer so as to have a total pressure of 9 kg/cm$^2$. After polymerization for 2 hours at 70° C., atactic polypropylene having a weight average molecular weight of 180,000 was obtained.

<Preparation of Polyolefin Microporous Substrate>

The polyolefin microporous substrate (Preparation Example 1 to Preparation Example 13) used in Examples of the invention and Comparative Examples was prepared according to the method described below.

As a material for forming a film, the following polyethylenes and polypropylene were prepared.

GUR2126: manufactured by Ticona, weight average molecular weight of 4,150,000

GURX143: manufactured by Ticona, weight average molecular weight of 560,000

HI-ZEX 8000F: manufactured by Prime Polymer Co., Ltd., weight average molecular weight of 250,000

HI-ZEX 7000F: manufactured by Prime Polymer Co., Ltd., weight average molecular weight of 200,000 polypropylene: Polymerization Example 2 as described above, weight average molecular weight of 180,000

Preparation Example 1

GUR2126, GURX143, HI-ZEX 8000F, and HI-ZEX 7000F were mixed with each other with mixing ratio of 2:37:13:48 (mass ratio). The weight average molecular weight (in terms of polystyrene) (Dalton) of the resulting polyethylene mixture was 460,000 measured by GPC, and a content of polyethylene having a molecular weight of 100,000 or less is 23% by mass relative to the total amount of polyolefin.

The polyethylene mixture was dissolved in a mixed solvent of liquid paraffin (SMOIL P-350P, manufactured by MORESCO Corporation, boiling point: 480° C.) and decalin to give a polyethylene solution so as to have a polyethylene concentration of 30% by mass. The composition of the polyethylene solution was polyethylene:liquid paraffin:decalin=30:45:25 (mass ratio).

The thus obtained polyethylene solution was extruded from a die at 148° C. and passed through a cooling roll in a water bath at 0° C., followed by rapid cooling at 60° C./min or more to produce a gel-like tape (base tape). The base tape was dried for 8 min at 60° C. and for 15 min at 95° C. Thereafter, the base tape was drawn by biaxial drawing where longitudinal drawing and transversal drawing were performed sequentially. After the transversal drawing, thermal fixation was performed at 125° C. to give a sheet. In the longitudinal drawing (MD direction), the drawing ratio was 5 times and the drawing temperature was 90° C. In the drawing (TD direction), the drawing ratio was 8 times and the drawing temperature was 105° C. The planar drawing ratio was 40.

Next, the thus obtained sheet was immersed in a methylene chloride bath to extract and remove liquid paraffin and decalin. Thereafter, the resulting product was dried at 50° C. to remove methylene chloride and subjected to an annealing treatment at 120° C. for 10 min to provide a polyolefin microporous substrate. Hereinbelow, this polyolefin microporous substrate may be referred to as PO1.

PO1 was able to be favorably produced without any operational problem during each step including film forming of the base tape, drawing, and post treatment. The film properties of PO1 are described in Table 1.

Preparation Example 2 to Preparation Example 9

The polyolefin microporous substrates PO2 to PO9 were obtained in the same manner as Preparation Example 1 except that in the preparation of the polyolefin solution, the mixing ratio of GUR2126, GURX143, HI-ZEX 8000F, HI-ZEX 7000F, and polypropylene was changed to have the content of polyolefin having a molecular weight of 100,000 or less relative to the total mass of polyolefins of the % by mass value described in Tables 1 and 2.

PO2 to PO9 was able to be favorably produced without any operational problem during each step including film forming of the base tape, drawing, and post treatment. The film properties of PO2 to PO9 are described in Tables 1 and 2.

Preparation Example 10

The polyolefin microporous base PO10 was obtained in the same manner as Preparation Example 1 except that, in the step for preparing the polyolefin solution, the mixing ratio of GUR2126 and GURX143 was changed to 10:90 (mass ratio), and, in the step of drawing, the longitudinal drawing ratio is changed to 5.5 times and the transversal drawing ratio is changed to 11 times. PO10 was able to be favorably produced without any operational problem during each step including film forming of the base tape, drawing, and post treatment. The film properties of PO10 are described in Table 2.

Preparation Example 11

The polyolefin microporous substrate PO11 was obtained in the same manner as Preparation Example 1 except that, in the step for preparing the polyolefin solution, the mixing ratio of GUR2126 and GURX143 was changed to 30:70 (mass ratio), the concentration of polyethylene in the polyethylene solution was changed to 25% by mass, the mixing ratio of polyethylene, paraffin, and decalin was changed to 25:37.5:37.5 (mass ratio), and, in the step of drawing, the longitudinal drawing ratio was changed to 5.5 times and the transversal drawing ratio was changed to 11 times. PO11 was able to be favorably produced without any operational problem during each step including film forming of the base tape, drawing, and post treatment of a base tape. The film properties of PO11 are described in Table 2.

Preparation Example 12

The polyolefin microporous substrate PO12 was obtained in the same manner as Preparation Example 1 except that, in the step for preparing the polyolefin solution, the mixing ratio of GUR2126 and GURX143 was changed to 50:50 (mass ratio), the concentration of polyethylene in the polyethylene solution was changed to 21% by mass, the mixing ratio of polyethylene, paraffin, and decalin was changed to 21:31.5:47.5 (mass ratio), and, in the step of drawing, the longitudinal drawing ratio was changed to 5.5 times and the transversal drawing ratio was changed to 11 times. PO12 was able to be favorably produced without any operational problem during each step including film forming, drawing, and post treatment of a base tape. The film properties of PO12 are described in Table 2.

Preparation Example 13

The polyolefin microporous base PO13 was obtained in the same manner as Preparation Example 1 except that, in the step for preparing the polyolefin solution, the mixing ratio of GUR2126 and GURX143 was changed to 20:80 (mass ratio), the mixing ratio of polyethylene, paraffin, and decalin was changed to 30:68:2 (mass ratio), and, in the step of drawing, the longitudinal drawing ratio was changed to 5.8 times and the transversal drawing ratio was changed to 13 times. PO13 was able to be favorably produced without any operational problem during each step including film forming of the base tape, drawing, and post treatment. The film properties of PO13 are described in Table 2.

TABLE 1

|  |  |  | Preparation Example 1 | Preparation Example 2 | Preparation Example 3 | Preparation Example 4 | Preparation Example 5 | Preparation Example 6 |
|---|---|---|---|---|---|---|---|---|
| Polyolefin microporous substrate |  |  | PO1 | PO2 | PO3 | PO4 | PO5 | PO6 |
| Mixing ratio of polyolefin | GUR2126 | % by mass | 2 | 5 | 17 | 11 | 11 | 9 |
|  | GURX143 |  | 37 | 40 | 58 | 45 | 42 | 38 |
|  | HI-ZEX 8000F |  | 13 | 25 | 15 | 17 | 16 | 14 |
|  | HI-ZEX 7000F |  | 48 | 30 | 10 | 22 | 21 | 19 |
|  | Polypropylene |  | 0 | 0 | 0 | 5 | 10 | 20 |
| Composition of polyolefin | Weight average molecular weight | Dalton | 460,000 | 600,000 | 1,130,000 | 850,000 | 840,000 | 750,000 |
|  | Content of polyolefin having a molecular weight of 100,000 or less | % by mass | 23 | 19 | 11 | 16 | 17 | 19 |
|  | Content of polyethylene |  | 100 | 100 | 100 | 95 | 90 | 80 |
|  | Content of polypropylene |  | 0 | 0 | 0 | 5 | 10 | 20 |
| Film thickness |  | μm | 12 | 12 | 12 | 12 | 12 | 12 |
| Pore diameter |  | nm | 9 | 40 | 50 | 40 | 40 | 30 |
| Porosity |  | % | 18 | 30 | 40 | 35 | 30 | 25 |
| Thermal shrinkage ratio |  | % | 15 | 14 | 16 | 17 | 20 | 30 |
| Gurley value |  | Second/100 cc | 140 | 130 | 120 | 145 | 150 | 170 |
| Film resistance(20° C.) |  | Ohm · cm$^2$ | 3.0 | 2.1 | 2.2 | 2.8 | 3.1 | 3.3 |
| Maximum value of d(logR)/dT |  | Ohm · cm$^2$/° C. | 1.0 | 1.3 | 2.1 | 1.1 | 1.0 | 0.9 |
| Short circuit resistance of battery |  | — | C | C | C | C | C | B |

TABLE 2

|  |  |  | Preparation Example 7 | Preparation Example 8 | Preparation Example 9 | Preparation Example 10 | Preparation Example 11 | Preparation Example 12 | Preparation Example 13 |
|---|---|---|---|---|---|---|---|---|---|
| Polyolefin microporous substrate |  |  | PO7 | PO8 | PO9 | PO10 | PO11 | PO12 | PO13 |
| Mixing ratio of polyolefin | GUR2126 | % by mass | 99 | 1 | 33 | 10 | 30 | 50 | 20 |
|  | GURX143 |  | 1 | 22 | 57 | 90 | 70 | 50 | 80 |
|  | HI-ZEX 8000F |  | 0 | 28 | 3 | 0 | 0 | 0 | 0 |
|  | HI-ZEX 7000F |  | 0 | 49 | 7 | 0 | 0 | 0 | 0 |
|  | Polypropylene |  | 0 | 0 | 0 | 0 | 0 | 0 | 0 |
| Composition of polyolefin | Weight average molecular weight | Dalton | 4,120,000 | 410,000 | 1,740,000 | 950,000 | 1,660,000 | 2,370,000 | 1,300,000 |
|  | Content of polyolefin having a molecular weight of 100,000 or less | % by mass | 0.5 | 26 | 7 | 6 | 4 | 3 | 5 |
|  | Content of polyethylene |  | 100 | 100 | 100 | 100 | 100 | 100 | 100 |
|  | Content of polypropylene |  | 0 | 0 | 0 | 0 | 0 | 0 | 0 |
| Film thickness |  | μm | 12 | 12 | 12 | 12 | 11 | 12 | 12 |
| Pore diameter |  | nm | 180 | 8 | 70 | 55 | 40 | 35 | 50 |
| Porosity |  | % | 65 | 17 | 45 | 36 | 36 | 37 | 38 |
| Thermal shrinkage ratio |  | % | 5 | 17 | 12 | 28 | 29 | 25 | 28 |
| Gurley value |  | Second/100 cc | 105 | 200 | 120 | 301 | 306 | 351 | 162 |
| Film resistance(20° C.) |  | Ohm · cm$^2$ | 3.2 | 3.5 | 2.5 | 2.6 | 2.5 | 2.6 | 3.2 |
| Maximum value of d(logR)/dT |  | Ohm · cm$^2$/° C. | 0.5 | 0.3 | 2.0 | 2.2 | 2.1 | 1.9 | 2.0 |
| Short circuit resistance of battery |  | — | C | C | C | C | C | C | C |

Production of Separator for Non-aqueous Electrolyte Battery

Example 1

Preparation of Coating Slurry for Heat Resistant Porous Layer

PMIA (1) of Polymerization Example 1 and aluminum hydroxide (H-43M, manufactured by Showa Denko K.K.) having an average particle diameter of 0.8 µm as an inorganic filler were prepared. They were mixed with a mixed solvent of dimethyl acetamide (DMAc) and tripropylene glycol (TPG) (DMAc:TPG=50:50 [mass ratio]) such that the mixing ratio of PMIA (1) and aluminum hydroxide (PMIA (1):aluminum hydroxide) is 25:75 (mass ratio) and the concentration of the PMIA (1) is 5.5% by mass, whereby the slurry for coating was prepared.

—Formation of Heat Resistant Porous Layer—

An appropriate amount of the coating slurry was placed on a pair of Meyer bars (size number #6) disposed to face each other with a clearance of about 20 µm. The polyolefin microporous substrate PO1 was passed through the Meyer bars, thereby coating the coating slurry on both the sides of PO1 without rotating the pair of Meyer bars (i.e., no-rotation method).

Both ends of the resulting product were clamped with a chuck, and the resulting product was immersed in a coagulation liquid (water:DMAc:TPG=50:25:25 [mass ratio]) at 20° C., and then rinsed with water and dried to obtain a separator for a non-aqueous electrolyte battery having a heat resistant porous layer formed on both sides of the PO1 (2 µm per side×both sides). Properties of the separator for a non-aqueous electrolyte battery and performance of the battery provided with the separator for a non-aqueous electrolyte battery are described in Table 3.

Example 2 to Example 6

The separator for a non-aqueous electrolyte battery was prepared in the same manner as Example 1 except that the polyolefin microporous substrate PO1 was replaced with the substrates described in Table 3. Properties of each separator for a non-aqueous electrolyte battery and performance of each battery provided with the separator for a non-aqueous electrolyte battery are described in Table 3.

Example 7

Preparation of Coating Slurry for Heat Resistant Porous Layer

PMIA (1) of the Polymerization Example 1 and aluminum hydroxide (H-43M, manufactured by Showa Denko K.K.) having an average particle diameter of 0.8 µm as an inorganic filler were prepared. They were mixed with a mixed solvent of dimethyl acetamide (DMAc) and tripropylene glycol (TPG) (DMAc:TPG=90:10 [mass ratio]) such that the mixing ratio of PMIA (1) and aluminum hydroxide (PMIA (1):aluminum hydroxide) is 25:75 (mass ratio) and the concentration of the PMIA (1) is 5.5% by mass, whereby the slurry for coating was prepared.

—Forming Heat Resistant Porous Layer—

An appropriate amount of the coating slurry was placed on a pair of Meyer bars (size number #6) disposed to face each other with a clearance of about 20 µm. The polyolefin microporous substrate PO3 was passed through the Meyer bars, thereby coating the coating slurry on both sides of PO3 without rotating the pair of Meyer bars (i.e., no-rotation method).

Both ends of the resulting product were clamped with a chuck, and the resulting product was immersed in a coagulation liquid (water:DMAc:TPG=50:45:5 [mass ratio]) at 20° C., and then rinsed with water and dried to obtain a separator for a non-aqueous electrolyte battery having a heat resistant porous layer formed on both sides of PO3 (2 µm per side×both sides). Properties of the separator for a non-aqueous electrolyte battery and performance of the battery provided with the separator for a non-aqueous electrolyte battery are described in Table 3.

Example 8

Preparation of Coating Slurry for Heat Resistant Porous Layer

PMIA (1) of Polymerization Example 1 and aluminum hydroxide (H-43M, manufactured by Showa Denko K.K.) having an average particle diameter of 0.8 µm as an inorganic filler were prepared. They were mixed with a mixed solvent of dimethyl acetamide (DMAc) and tripropylene glycol (TPG) (DMAc:TPG=40:60 [mass ratio]) such that the mixing ratio of PMIA (1) and aluminum hydroxide (PMIA (1):aluminum hydroxide) is 20:80 (mass ratio) and the concentration of the PMIA (1) is 5.5% by mass, whereby the slurry for coating was prepared.

—Formation of Heat Resistant Porous Layer—

An appropriate amount of the coating slurry was placed on a pair of Meyer bars (size number #6) disposed to face each other with a clearance of about 20 µm. The polyolefin microporous substrate PO3 was passed through the Meyer bars, thereby coating the coating slurry on both sides of PO3 without rotating the pair of Meyer bars (i.e., no-rotation method).

Both ends of the resulting product were clamped with a chuck, and the resulting product was immersed in a coagulation liquid (water:DMAc:TPG=50:20:30 [mass ratio]) at 20° C., and then rinsed with water and dried to obtain a separator for a non-aqueous electrolyte battery having a heat resistant porous layer formed on both sides of PO3 (2 µm per side×both sides). Properties of the separator for a non-aqueous electrolyte battery and performance of the battery provided with the separator for a non-aqueous electrolyte battery are described in Table 3.

Comparative Example 1 and Comparative Example 2

The separator for a non-aqueous electrolyte battery was prepared in the same manner as Example 1 except that the polyolefin microporous substrate PO1 is replaced with the substrates described in Table 4. Properties of each separator for a non-aqueous electrolyte battery and performance of each battery provided with the separator for a non-aqueous electrolyte battery are described in Table 4.

Comparative Example 3

Preparation of Coating Slurry for Heat Resistant Porous Layer

PMIA (1) of Polymerization Example 1 and aluminum hydroxide (H-43M, manufactured by Showa Denko K.K.) having an average particle diameter of 0.8 µm as an inorganic filler were prepared. They were mixed with a mixed solvent of dimethyl acetamide (DMAc) and tripropylene glycol (TPG) (DMAc:TPG=80:20 [mass ratio]) such that the mixing ratio of PMIA (a) and aluminum hydroxide (PMIA (1):aluminum hydroxide) is 80:20 (mass ratio) and the concentration of the PMIA (1) is 5.5% by mass, whereby the slurry for coating was prepared.

—Formation of Heat Resistant Porous Layer—

An appropriate amount of the coating slurry was placed on a pair of Meyer bars (size number #6) was disposed to face each other with a clearance of 20 µm. The polyolefin microporous substrate PO3 was passed through the Meyer bars, thereby coating the coating slurry on both the surfaces of the PO3 without rotating the pair of Meyer bars (i.e., no-rotation method).

Both ends of the resulting product were clamped with a chuck, and the resulting product was immersed in a coagulation liquid (water:DMAc:TPG=50:40:10 [mass ratio]) at 0° C., and then rinsed with water and dried to obtain a separator for a non-aqueous electrolyte battery having a heat resistant porous layer formed on both surfaces of the PO3 (2 µm per side×both sides). Properties of the separator for a non-aqueous electrolyte battery and performance of the battery provided with the separator for a non-aqueous electrolyte battery are described in Table 4.

Comparative Example 4 to Comparative Example 8

The separator for a non-aqueous electrolyte battery was prepared in the same manner as Example 1 except that the polyolefin microporous substrate PO1 is replaced with the substrates described in Table 4. Properties of each separator for a non-aqueous electrolyte battery and performance of each battery provided with the separator for a non-aqueous electrolyte battery are described in Table 4.

TABLE 3

| | | | Example 1 | Example 2 | Example 3 | Example 4 | Example 5 | Example 6 | Example 7 | Example 8 |
|---|---|---|---|---|---|---|---|---|---|---|
| Polyolefin microporous substrate | Substrate | | PO1 | PO2 | PO3 | PO4 | PO5 | PO6 | PO3 | PO3 |
| | Weight average molecular weight | Dalton | 460,000 | 600,000 | 1,130,000 | 850,000 | 840,000 | 750,000 | 1,130,000 | 1,130,000 |
| | Content of polyolefin having a molecular weight of 100,000 or less | % by mass | 23 | 19 | 11 | 16 | 17 | 19 | 11 | 11 |
| | Content of polyethylene | | 100 | 100 | 100 | 95 | 90 | 80 | 100 | 100 |
| | Content of polypropylene | | 0 | 0 | 0 | 5 | 10 | 20 | 0 | 0 |
| | Film thickness | µm | 12 | 12 | 12 | 12 | 12 | 12 | 12 | 12 |
| | Pore diameter | nm | 9 | 40 | 50 | 40 | 40 | 30 | 50 | 50 |
| | Porosity | % | 18 | 30 | 40 | 35 | 30 | 25 | 40 | 40 |
| Heat resistant porous layer | Pore diameter | nm | 120 | 120 | 120 | 120 | 120 | 120 | 60 | 220 |
| | Porosity | % | 60 | 60 | 60 | 60 | 60 | 60 | 30 | 80 |
| | Thickness (one side) | µm | 2 | 2 | 2 | 2 | 2 | 2 | 2 | 2 |
| Separator | Total thickness | µm | 16 | 16 | 16 | 16 | 16 | 16 | 16 | 16 |
| | Porosity | % | 29 | 38 | 45 | 41 | 38 | 34 | 38 | 50 |
| | Thermal shrinkage ratio | % | 3.5 | 3.0 | 3.0 | 3.8 | 4.5 | 7.0 | 2.0 | 3.2 |
| | Gurley value | Second/100 cc | 240 | 230 | 220 | 245 | 250 | 270 | 200 | 260 |
| | Film resistance (20° C.) | Ohm · cm$^2$ | 4.6 | 3.7 | 3.8 | 4.4 | 4.7 | 4.9 | 3.7 | 4.8 |
| | Maximum value of d(logR)/dT | Ohm · cm$^2$/° C. | 0.8 | 1.2 | 2.0 | 0.9 | 0.8 | 0.8 | 1.5 | 1.4 |
| | Shut down temperature | ° C. | 136 | 139 | 140 | 143 | 144 | 145 | 140 | 139 |
| | Shut down temperature width | ° C. | 6 | 2 | 1 | 7 | 8 | 9 | 8 | 7 |
| Short circuit resistance of battery | | — | A | A | A | A | A | A | A | A |

TABLE 4

| | | | comparative Example 1 | comparative Example 2 | comparative Example 3 | comparative Example 4 | comparative Example 5 | comparative Example 6 | comparative Example 7 | comparative Example 8 |
|---|---|---|---|---|---|---|---|---|---|---|
| Polyolefin microporous substrate | Substrate | | PO7 | PO8 | PO3 | PO9 | PO10 | PO11 | PO12 | PO13 |
| | Weight average molecular weight | Dalton | 412,000 | 410,000 | 1,130,000 | 1,740,000 | 950,000 | 1,660,000 | 2,370,000 | 1,300,000 |
| | Content of polyolefin having a molecular weight of 100,000 or less | % by mass | 0.5 | 26 | 11 | 7 | 6 | 4 | 3 | 5 |

TABLE 4-continued

|  |  |  | comparative Example 1 | comparative Example 2 | comparative Example 3 | comparative Example 4 | comparative Example 5 | comparative Example 6 | comparative Example 7 | comparative Example 8 |
|---|---|---|---|---|---|---|---|---|---|---|
|  | Content of polyethylene |  | 100 | 100 | 100 | 100 | 100 | 100 | 100 | 100 |
|  | Content of polypropylene |  | 0 | 0 | 0 | 0 | 0 | 0 | 0 | 0 |
|  | Film thickness | μm | 12 | 12 | 12 | 12 | 12 | 11 | 12 | 12 |
|  | Pore diameter | nm | 180 | 8 | 50 | 70 | 55 | 40 | 35 | 50 |
|  | Porosity | % | 65 | 17 | 40 | 45 | 36 | 36 | 37 | 38 |
| Heat resistant porous layer | Pore diameter | μm | 120 | 120 | 48 | 120 | 120 | 120 | 120 | 120 |
|  | Porosity | % | 60 | 60 | 28 | 60 | 60 | 60 | 60 | 60 |
|  | Thickness (one side) | μm | 2 | 2 | 2 | 2 | 2 | 2 | 2 | 2 |
| Separator | Total thickness | μm | 16 | 16 | 16 | 16 | 16 | 15 | 16 | 16 |
|  | Porosity | % | 64 | 28 | 37 | 49 | 42 | 42 | 43 | 44 |
|  | Thermal shrinkage ratio | % | 1.0 | 4.0 | 5.0 | 2.8 | 8 | 8 | 9 | 8 |
|  | Gurley value | Second/100 cc | 210 | 300 | 290 | 220 | 405 | 410 | 450 | 280 |
|  | Film resistance (20° C.) | Ohm·cm² | 4.8 | 5.1 | 5.2 | 4.1 | 5.2 | 5.2 | 5.5 | 4.4 |
|  | Maximum value of d(logR)/dT | Ohm·cm²/° C. | 0.25 | 0.2 | 0.28 | 0.79 | 0.75 | 0.76 | 0.79 | 0.76 |
|  | Shut down temperature | ° C. | 148 | 136 | 142 | 137 | 146 | 146 | 142 | 146 |
|  | Shut down temperature width | ° C. | 12 | 6 | 8 | 2 | 2 | 3 | 3 | 2 |
| Short circuit resistance of battery |  | — | C | C | C | B | B | B | B | B |

As easily understood from Table 3, Example 1 to Example 8 corresponding to the present invention exhibit excellent shut down responsiveness and excellent short circuit resistance.

INDUSTRIAL APPLICABILITY

The separator for a non-aqueous electrolyte battery according to the invention has excellent shut down responsiveness and excellent short circuit resistance, and therefore it may be desirably used for a lithium battery.

The disclosure of Japanese Patent Application No. 2010-243898 filed on Oct. 29, 2010 is incorporated herein by reference.

All publications, patent applications and technical standards mentioned in this specification are herein incorporated by reference to the same extent as if each individual publication, patent applications or technical standard was specifically and individually indicated to be incorporated by reference.

The invention claimed is:

1. A separator for a non-aqueous electrolyte battery, the separator comprising:
    a polyolefin microporous substrate in which a content of polyethylene having a molecular weight of 100,000 or less is from 10% by mass to 25% by mass relative to a total amount of polyolefin, and
    a heat resistant porous layer that is formed on and directly contacts one or both sides of the polyolefin microporous substrate and that includes a heat resistant polymer that has a crystal melting point of 200° C. or higher as measured by differential scanning calorimetry, wherein
    a maximum value of S, which is represented by the following formula (1), is 1.2 or more, and
    a temperature exhibiting the maximum value of S is from 130° C. to 155° C.:

$$S = d(\log R)/dT \qquad \text{Formula (1):}$$

wherein, in formula (1), R represents a resistance (ohm·cm²) of a cell, and T represents a temperature (° C.), in a measurement using a battery that includes the cell that is provided with a separator for a non-aqueous electrolyte battery, at a temperature rising rate of 1.6° C./min,
wherein in the polyolefin microporous substrate, a polyethylene content relative to the total amount of polyolefin is 90% by mass or more, and
wherein the polyolefin microporous substrate has a porosity of from 20% to 60%, and a pore diameter as measured by a specific surface area method of from 10 nm to 150 nm.

2. The separator for a non-aqueous electrolyte battery according to claim 1, wherein a difference between the temperature exhibiting the maximum value of S and a lowest temperature among temperatures exhibiting a value of S of 0.8 is 5° C. or less.

3. The separator for a non-aqueous electrolyte battery according to claim 1, wherein the heat resistant porous layer has a porosity of from 30% to 90%, and a pore diameter as measured by a specific surface area method of from 50 nm to 250 nm.

4. A non-aqueous electrolyte secondary battery comprising a positive electrode, a negative electrode, and a separator for a non-aqueous electrolyte battery according to claim 1 that is disposed between the positive electrode and the negative electrode, the battery obtaining an electromotive force through doping and dedoping of lithium.

5. The non-aqueous electrolyte secondary battery according to claim 4, wherein a difference between the temperature exhibiting the maximum value of S and a lowest temperature among temperatures exhibiting a value of S of 0.8 is 5° C. or less.

6. The non-aqueous electrolyte secondary battery according to claim 4, wherein the heat resistant porous layer has a porosity of from 30% to 90%, and a pore diameter as measured by a specific surface area method of from 50 nm to 250 nm.

\* \* \* \* \*